United States Patent
Zimmer

(10) Patent No.: US 12,449,231 B2
(45) Date of Patent: *Oct. 21, 2025

(54) LASER INDUCED FRICTION SURFACE ON FIREARM

(71) Applicant: ZPE LICENSING INC., Temecula, CA (US)

(72) Inventor: Andrew Jason Zimmer, Temecula, CA (US)

(73) Assignee: ZPE LICENSING INC., Temecula, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/736,390

(22) Filed: Jun. 6, 2024

(65) Prior Publication Data
US 2024/0328750 A1    Oct. 3, 2024

Related U.S. Application Data

(63) Continuation of application No. 17/822,550, filed on Aug. 26, 2022, now Pat. No. 12,085,359, which is a continuation of application No. 17/013,682, filed on Sep. 7, 2020, now Pat. No. 11,549,781, which is a continuation of application No. 15/976,723, filed on May 10, 2018, now Pat. No. 10,794,663.

(60) Provisional application No. 62/505,010, filed on May 11, 2017.

(51) Int. Cl.
| | |
|---|---|
| *F16H 55/36* | (2006.01) |
| *B23K 26/352* | (2014.01) |
| *F41A 3/72* | (2006.01) |
| *F41A 35/00* | (2006.01) |
| *F41C 23/18* | (2006.01) |
| *B23K 103/04* | (2006.01) |

(52) U.S. Cl.
CPC .......... *F41C 23/18* (2013.01); *B23K 26/3576* (2018.08); *B23K 26/3584* (2018.08); *F41A 3/72* (2013.01); *F41A 35/00* (2013.01); *B23K 2103/05* (2018.08)

(58) Field of Classification Search
CPC . F41C 23/18; B23K 26/3576; B23K 26/3584; F41A 3/72; F41A 35/00; F16H 55/36; F16H 55/38; B25B 27/023
USPC ........... 42/71.01; 474/177, 170, 199; 29/259
See application file for complete search history.

(56) References Cited

U.S. PATENT DOCUMENTS

| | | |
|---|---|---|
| 662,046 A | 11/1900 | Winter |
| 902,224 A | 10/1908 | Fouillaron |
| 936,213 A | 10/1909 | Bordenkircher |

(Continued)

FOREIGN PATENT DOCUMENTS

| | | |
|---|---|---|
| JP | 2019138324 A | 8/2019 |
| WO | 2013159910 A1 | 10/2013 |

OTHER PUBLICATIONS

Steeda Autosports, http://www.steeda.com/steeda-gt500-supercharger-pulley-puller-555-8902/, [Published as early as Mar. 14, 2014].

(Continued)

*Primary Examiner* — Michael D David
(74) *Attorney, Agent, or Firm* — DANE IP Law PC

(57) ABSTRACT

A firearm having a laser induced friction surface. A method for forming the laser induced friction surface on the firearm may includes the steps of disposing the laser machine adjacent to a component of the firearm, adjusting the laser machine, then applying the laser beam of the laser machine onto a component surface.

12 Claims, 20 Drawing Sheets

(56) References Cited

U.S. PATENT DOCUMENTS

| | | |
|---|---|---|
| 1,176,787 A | 3/1916 | Swabb |
| 1,350,670 A | 8/1920 | Ritter |
| 1,601,662 A | 9/1926 | Abbott |
| 1,966,831 A | 7/1934 | Torrence |
| 2,182,774 A | 12/1939 | Birnbaum |
| 2,184,545 A | 12/1939 | Collier |
| 2,187,188 A | 1/1940 | Whitcomb |
| 2,230,902 A | 2/1941 | Overbey |
| 2,390,875 A | 12/1945 | Firth |
| 2,402,743 A | 6/1946 | Firth |
| 2,413,817 A | 1/1947 | Firth |
| 2,495,459 A | 1/1950 | Kessler |
| 2,516,829 A | 7/1950 | Reeves |
| 2,548,387 A | 4/1951 | May |
| 2,553,791 A | 5/1951 | Smith |
| 2,609,699 A | 9/1952 | Rohn |
| 2,633,751 A | 4/1953 | Browning |
| 2,643,549 A | 6/1953 | Whitesell |
| 2,701,491 A | 2/1955 | Ross |
| 2,748,618 A | 6/1956 | Lee |
| 2,779,202 A | 1/1957 | Jackson |
| 2,836,982 A | 6/1958 | Voss |
| 2,905,361 A | 9/1959 | Noall |
| 2,963,145 A | 12/1960 | Bruestle |
| 3,078,556 A | 2/1963 | Carroll |
| 3,445,130 A | 5/1969 | Obenshain |
| 3,473,202 A | 10/1969 | Howard |
| 3,599,311 A | 8/1971 | Ellis |
| 3,604,280 A | 9/1971 | Davis |
| 3,651,557 A | 3/1972 | Bagley |
| 3,666,613 A | 5/1972 | Beninga |
| 3,738,691 A | 6/1973 | Firth |
| 3,772,928 A | 11/1973 | Gobeille |
| 3,776,059 A | 12/1973 | Habermann |
| 3,945,102 A | 3/1976 | Kotlar |
| 3,958,063 A | 5/1976 | Robson |
| 4,034,458 A | 7/1977 | Ford |
| 4,142,811 A | 3/1979 | Burnham |
| 4,291,426 A | 9/1981 | Bishop, Jr. |
| 4,364,736 A | 12/1982 | Hetz |
| 4,366,609 A | 1/1983 | Speer |
| 4,468,210 A | 8/1984 | McCutchan, Jr. |
| 4,548,592 A | 10/1985 | Ohhashi |
| 4,612,208 A | 9/1986 | Reichenecker |
| 4,692,128 A | 9/1987 | Sadler |
| 4,781,656 A | 11/1988 | Brackett |
| 4,781,660 A | 11/1988 | Amataka |
| 4,781,661 A | 11/1988 | Emmett |
| 4,790,799 A | 12/1988 | Sadler |
| 4,826,412 A | 5/1989 | Kubo |
| 4,838,842 A | 6/1989 | Ohkata |
| 4,860,618 A | 8/1989 | Givot |
| 4,905,361 A | 3/1990 | Morishita |
| 4,913,689 A | 4/1990 | Morishita |
| 4,947,533 A | 8/1990 | Taniguchi |
| 4,947,713 A | 8/1990 | Arnold |
| 5,069,654 A | 12/1991 | Rampe |
| 5,106,672 A | 4/1992 | Rabe |
| 5,168,972 A | 12/1992 | Smith |
| 5,269,982 A | 12/1993 | Brotz |
| 5,289,813 A | 3/1994 | Adachi |
| 5,306,096 A | 4/1994 | Tuens |
| 5,374,221 A | 12/1994 | Casada |
| 5,454,760 A | 10/1995 | Aranibar |
| 5,507,698 A | 4/1996 | Kuribayashi |
| D370,397 S | 6/1996 | White |
| 5,593,366 A | 1/1997 | Puzik |
| 5,637,353 A | 6/1997 | Kimock |
| 5,894,650 A | 4/1999 | Barenburg |
| 5,997,012 A | 12/1999 | Brian |
| 6,089,833 A | 7/2000 | Glanfield |
| 6,253,648 B1 | 7/2001 | Beery |
| 6,254,503 B1 | 7/2001 | Chiba |
| 6,266,860 B1 | 7/2001 | Kiebler |
| 6,415,491 B1 | 7/2002 | Klann |
| 6,543,113 B1 | 4/2003 | Khurana |
| 6,572,270 B2 | 6/2003 | Hiromichi |
| 6,648,781 B1 | 11/2003 | Fischer |
| 6,676,548 B2 | 1/2004 | Fujiwara |
| 6,731,043 B2 | 5/2004 | Pritchard |
| 6,761,093 B2 | 7/2004 | Chang |
| 6,796,919 B2 | 9/2004 | Johnson |
| 6,858,262 B2 | 2/2005 | Fischer |
| 6,951,156 B2 | 10/2005 | Garg |
| 6,960,117 B1 | 11/2005 | Mahadev |
| 7,004,730 B2 | 2/2006 | Williams |
| 7,096,765 B1 | 8/2006 | Diggle, III |
| 7,159,491 B1 | 1/2007 | Chaconas |
| 7,191,880 B2 | 3/2007 | Liston |
| 7,207,111 B2 | 4/2007 | Aloise |
| 7,210,379 B1 | 5/2007 | Pepin |
| 7,244,185 B2 | 7/2007 | Kamdem |
| 7,259,351 B2 | 8/2007 | Lineton |
| 7,284,464 B2 | 10/2007 | Chaconas |
| 7,297,081 B2 | 11/2007 | Eck |
| 7,350,447 B1 | 4/2008 | Smith |
| 7,448,972 B2 | 11/2008 | Garabello |
| 7,520,041 B1 | 4/2009 | Aguilar |
| 7,648,435 B2 | 1/2010 | Ishida |
| 7,653,975 B2 | 2/2010 | Hu |
| 7,780,556 B2 | 8/2010 | Sakanaka |
| 7,798,927 B2 | 9/2010 | Ishida |
| 7,824,287 B2 | 11/2010 | Nonoshita |
| 7,857,721 B2 | 12/2010 | Ishida |
| 7,958,635 B2 | 6/2011 | Yoshida |
| 7,996,972 B2 | 8/2011 | Hu |
| D662,046 S | 6/2012 | Unger |
| 8,308,590 B2 | 11/2012 | Fiordaliso |
| 8,485,068 B2 | 7/2013 | Campbell |
| 8,607,671 B2 | 12/2013 | Peirce et al. |
| 8,653,409 B1 | 2/2014 | Sodhi |
| 8,852,698 B2 | 10/2014 | Fukumitsu |
| 8,931,156 B1 | 1/2015 | Zimmer |
| 9,027,446 B1 | 5/2015 | Simkin |
| 9,028,353 B1 | 5/2015 | Zimmer |
| 9,254,922 B2 | 2/2016 | Anderson |
| 9,382,995 B2 | 7/2016 | Osborne |
| 9,421,637 B2 | 8/2016 | Zimmer |
| 9,551,409 B2 | 1/2017 | Zimmer |
| 9,714,700 B2 | 7/2017 | Briggs |
| 9,771,128 B2 | 9/2017 | Sugimoto |
| 9,839,995 B2 | 12/2017 | Kovach |
| 9,958,050 B2 | 5/2018 | Kolloch |
| 10,385,958 B2 | 8/2019 | Medaglia |
| 10,406,657 B2 | 9/2019 | Marovets |
| 10,618,588 B2 | 4/2020 | Cody |
| 10,655,723 B2 | 5/2020 | Zimmer |
| 10,794,663 B2 | 10/2020 | Zimmer |
| 11,148,709 B2 | 10/2021 | Lee |
| 11,149,767 B2 | 10/2021 | Pettey |
| 11,292,555 B2 | 4/2022 | Akanishi |
| 11,549,781 B2 | 1/2023 | Zimmer |
| 2001/0053727 A1 | 12/2001 | Nakashima |
| 2002/0083905 A1 | 7/2002 | Kim |
| 2002/0144986 A1 | 10/2002 | Grow |
| 2003/0139240 A1 | 7/2003 | Chen |
| 2004/0069440 A1 | 4/2004 | Hugenschutt |
| 2004/0089734 A1 | 5/2004 | Martin |
| 2004/0194585 A1 | 10/2004 | Clark |
| 2004/0200108 A1 | 10/2004 | Doiron |
| 2005/0003633 A1 | 1/2005 | Mahle |
| 2005/0032596 A1 | 2/2005 | Nonoshita |
| 2005/0148417 A1 | 7/2005 | Garabello |
| 2005/0217111 A1 | 10/2005 | Yoshida |
| 2005/0221938 A1 | 10/2005 | Yoshida |
| 2005/0272546 A1 | 12/2005 | Reiter |
| 2005/0282672 A1 | 12/2005 | Nonoshita |
| 2006/0027542 A1 | 2/2006 | Mahadev |
| 2007/0095333 A1 | 5/2007 | Jones |
| 2008/0066584 A1 | 3/2008 | Vines |
| 2008/0076611 A1 | 3/2008 | Fisher |
| 2008/0121073 A1 | 5/2008 | Williams |
| 2008/0161141 A1 | 7/2008 | Joo |
| 2009/0001058 A1 | 1/2009 | Lentz |

(56) References Cited

U.S. PATENT DOCUMENTS

| | | |
|---|---|---|
| 2009/0176034 A1 | 7/2009 | Ruuttu |
| 2009/0313799 A1 | 12/2009 | Oguri |
| 2010/0099239 A1 | 4/2010 | Dunne |
| 2010/0120562 A1 | 5/2010 | Kadokawa |
| 2010/0251528 A1 | 10/2010 | Hu |
| 2011/0030440 A1 | 2/2011 | Keane |
| 2011/0126394 A1 | 6/2011 | Heimmer |
| 2011/0155708 A1 | 6/2011 | Luetke |
| 2011/0318497 A1 | 12/2011 | Beals |
| 2012/0037473 A1 | 2/2012 | Ouwenga |
| 2012/0088615 A1 | 4/2012 | Briggs |
| 2012/0227551 A1 | 9/2012 | Miller |
| 2013/0292188 A1 | 11/2013 | Bilen |
| 2014/0060995 A1 | 3/2014 | Anderson |
| 2014/0112697 A1 | 4/2014 | Harmon |
| 2014/0190317 A1 | 7/2014 | Rosby |
| 2014/0224077 A1 | 8/2014 | Doumenis, Jr. |
| 2015/0024885 A1 | 1/2015 | Odenmarck |
| 2015/0060229 A1 | 3/2015 | Takahashi |
| 2015/0080158 A1 | 3/2015 | Van Der Heijde |
| 2015/0133248 A1 | 5/2015 | Wang |
| 2015/0252885 A1 | 9/2015 | Manzoor |
| 2015/0260271 A1 | 9/2015 | Zimmer |
| 2016/0003340 A1 | 1/2016 | Crump |
| 2016/0047456 A1 | 2/2016 | Kolloch |
| 2016/0053876 A1 | 2/2016 | Nakamura |
| 2016/0129526 A1 | 5/2016 | Russ |
| 2016/0334001 A1 | 11/2016 | Zimmer |
| 2017/0030436 A1 | 2/2017 | Duan |
| 2017/0089441 A1 | 3/2017 | Zimmer |
| 2018/0079074 A1 | 3/2018 | Devengenzo |
| 2018/0328692 A1 | 11/2018 | Zimmer |
| 2019/0047612 A1 | 2/2019 | Lee |
| 2019/0085925 A1 | 3/2019 | Lu |
| 2020/0240507 A1 | 7/2020 | Zimmer |
| 2023/0286115 A1 | 9/2023 | Hsieh |

OTHER PUBLICATIONS

VMP Tuning, http://vmptuning.com/tools/3inclam/, [Published as early as Mar. 14, 2014].

VMP Tuning, http://vmptuning.com/pulley-tools/vmpalltool/, [Published as early as Mar. 14, 2014].

International Search Report and Written Opinion on related PCT application (PCT/US2015/020611) from International Searching Authority (US) dated Jul. 15, 2015.

Lone Wolf as early as Apr. 24, 2015 (there may be more/earlier) and it's archived here: http://web.archive.org/web/20150424223706/https:/www.lonewolfdist.com/Detail.aspx?PROD=156322 (Year: 2015).

International Preliminary Report on Patentability on related PCT Application (PCT/US2015/020611) from the International Bureau of WIPO dated Sep. 14, 2016.

Behera et al., "Experimental investigations of nanosecond-pulsed Nd:YAG laser beam micromachining on 304 stainless steel", Journal of Micromanufacturing, 1 (1) 62-75, 2018, Reprints and permissions: in.sagepub.com/journals-permissions-india, DOI: 10.1177/2516598418766937, journals.sagepub.com/home/jmf, 14 pages.

Jagdheesh et al., "One-Step Generation of Ultrahydrophobic Aluminum Surface Patterns by Nanosecond Lasers", WLT, Lasers in Manufacturing Conference 2015, 9 pages.

Frank Flemming, "The Basics of Electromagnetic Clutches and Brakes", Ogura Industrial Corp, Jul. 2009, 4 pages.

Australian Examination Report No. 1 issued in App. No. AU2021202191, dated Mar. 21, 2025, 2 pages.

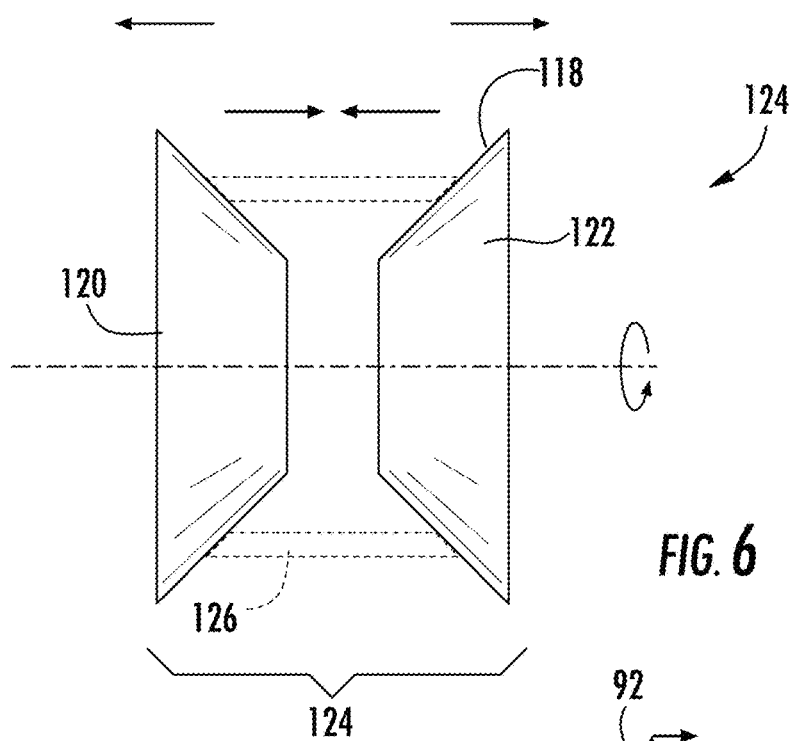
FIG. 6
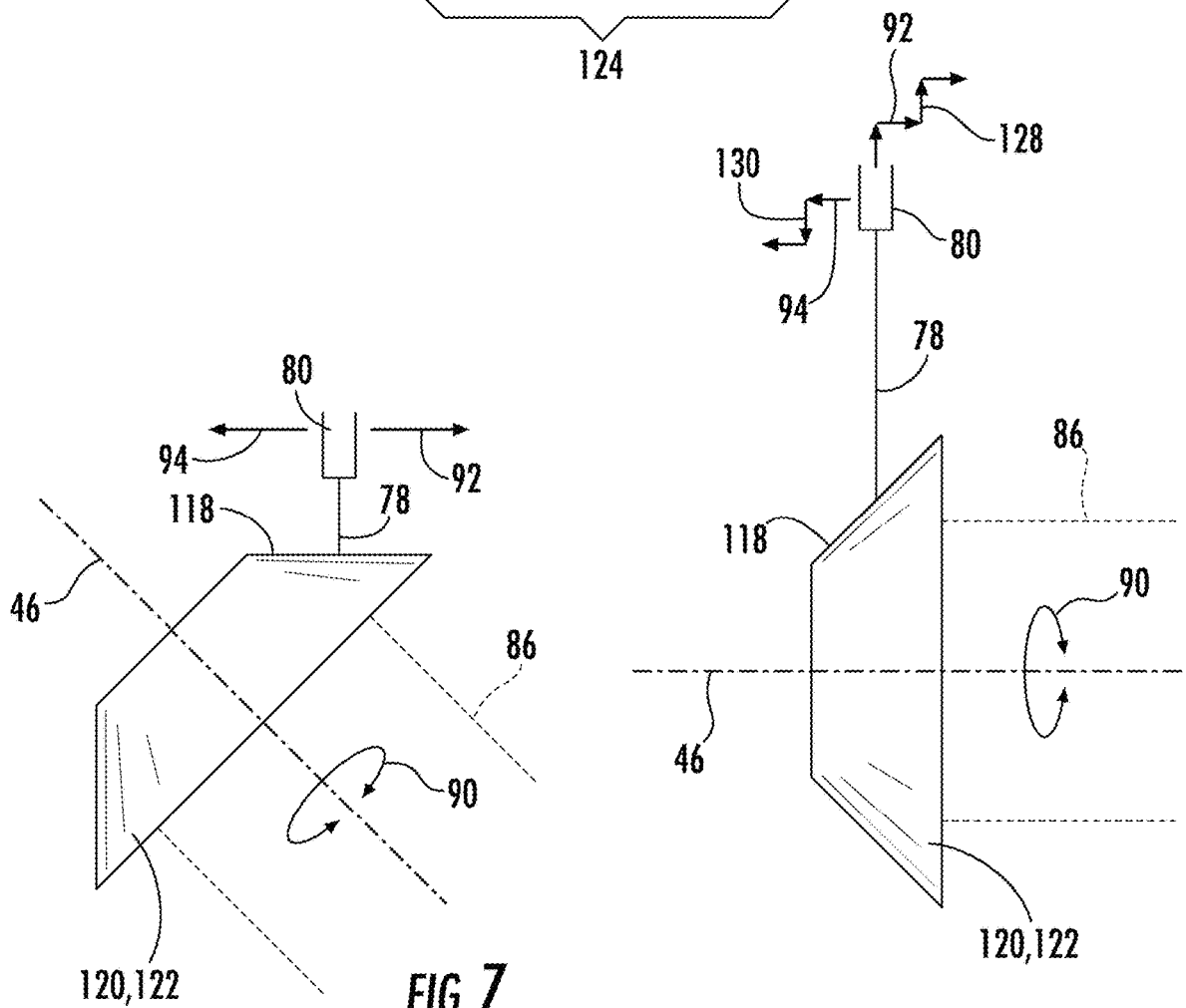
FIG. 7
FIG. 8

FIG. 14

| TYPE OF MATERIAL | EFFECT | TYPE OF PASS | NUMBER OF PASSES TOTAL | POWER % 0-70W | SPEED (INCH/SEC) | FREQUENCY (KILOHERTZ) 0-1000 | LASER ON TIME IN NANO SECONDS | SPI WAVE FORMS 0-36 | CROSS HATCHING ANGLES IN DEG, PATTERN OR FILL, BOTH SIZE IN INCH. | KERF WIDTH IN INCH INCLUDING RECAST, SINGLE LASER LINE MARK-MEAN | KERF WIDTH IN INCH NOT INCLUDING RECAST, SINGLE LASER LINE MARK-MEAN | WOBBLE FRQ HZ |
|---|---|---|---|---|---|---|---|---|---|---|---|---|
| ALUM 6061 | MICRO MACHINED SURFACE. MATERIAL REMOVAL | ROUGHING PASS | 2 | 95 | 50 | 50 | 420 | 34 | 0.001 | 90/180 | 0.0035 | 0.0024 | 0 |
| | | SMOOTHING PASS | 2 | 100 | 85 | 50 | 520 | 36 | 0.0005 | 90/45 | 0.003 | 0.00287 | 0 |
| | | BRAZING PASS FOR COLOR AND HARDNESS | 1 | 85 | 65 | 50 | 350 | 32 | 0.0003 | 120 | 0.0032 | 0.0029 | 0 |
| ALUM 6061 | RAISED SURFACE RECAST MATERIAL RE POPULATE | ROUGHING PASS | 2 | 100 | 25 | 250 | 55 | 16 | 0.003 | 45/135 | 0.0047 | 0.0024 | 0 |
| | | SMOOTHING PASS | 2 | 35 | 120 | 90 | 100 | 10 | 0.0006 | 90/45 | 0.0028 | 0.0025 | 0 |
| | | BRAZING PASS FOR DARK GREY COLOR AND HARDNESS | 1 | 65 | 50 | 55 | 350 | 32 | 0.0002 | 35 | 0.0034 | 0.0024 | 0 |
| STAINLESS STEEL 17-4 PH | MICRO MACHINED SURFACE. | ROUGHING PASS | 2 | 90 | 80 | 120 | 420 | 34 | 0.004 | 45/180 | 0.004 | 0.0021 | 0 |
| | | SMOOTHING PASS | 2 | 90 | 60 | 120 | 200 | 2 | 0.004 | 90/120 | 0.0038 | 0.0022 | 0 |
| | | BRAZING PASS FOR COLOR AND HARDNESS. SOME SMOOTHING | 1 | 55 | 35 | 120 | 30 | 22 | 0.0004 | 45 | 0.0026 | 0.0019 | 0 |

LASER INDUCED FRICTION SURFACE ON FIREARM

CROSS-REFERENCE TO RELATED APPLICATIONS

This application is a continuation of U.S. patent application Ser. No. 17/822,550, filed on 2022 Aug. 26, which is a continuation of U.S. patent application Ser. No. 17/013,682, filed on 2020 Sep. 7, now U.S. Pat. No. 11,549,781, which is a continuation of U.S. patent application Ser. No. 15/976,723, filed on 2018 May 10, now U.S. Pat. No. 10,794,663, which claims the benefit of U.S. Provisional Application No. 62/505,010, filed on 2017 May 11, the entire contents of which is expressly incorporated herein by reference.

STATEMENT RE: FEDERALLY SPONSORED RESEARCH/DEVELOPMENT

Not Applicable

BACKGROUND

The various embodiments and aspects described herein relate to components for a firearm.

The firearm has a variety of surfaces that is gripped by a user.

Accordingly, there is a need in the art for an improved method and device for mitigating slippage between the surfaces of the firearm and the user.

BRIEF SUMMARY

The various embodiments and aspects disclosed herein address the needs discussed above, discussed below and those that are known in the art.

A pulley assembly having a body, a shaft mount and a plurality of bolts that attach the body to the shaft mount is disclosed. The shaft mount is mountable to a shaft of a supercharger. The body is attachable to the shaft mount with the bolts. In particular, the shaft mount has a plurality of threaded holes that engage threads of the bolts. The body has a series of counter sunk holes that are aligned to the threaded holes of the shaft mount. The counter sunk holes have a him neck area that is minimally larger than a shoulder area of the bolt. As such, when the bolt is inserted into the counter sunk holes and threaded into the threaded holes of the shaft mount, the tight tolerancing (i.e., within 0.001 inches) between diameters of the necks of the counter sunk holes and the shoulder of the bolts align the body of the pulley assembly to the shaft mount and ultimately to the shaft of the supercharger. In another aspect, the outer surface of the body of the pulley assembly has a pattern of friction lines for increasing the frictional forces between the outer surface of the body of the pulley assembly and the belt driving the pulley. The friction lines may be formed by applying particulate matter to the outer surface of the body of the pulley assembly and fusing the applied particulate matter to the outer surface by heating the outer surface and the particulate matter. The heat may be generated by a laser beam that traces a desired pattern of friction lines. The increased friction mitigates noise by reducing slippage between a belt and the pulley. Alternatively, the laser may be used to remove material and to create a rough surface on the outer surface of the body of the pulley assembly. The heat generated from the laser beam may trace a desired pattern of friction lines.

More particularly, a pulley for transmitting rotational motion between first and second rotating shafts with a belt on an automobile engine is disclosed. The pulley may be fixed to the first rotating shaft. The pulley comprising a body and a laser infused friction material. The body may have a cylindrical central hole for receiving the first rotating shaft and mounting the body onto the first rotating shaft on the automobile engine. The cylindrical central hole may define a central axis about which the body rotates. The body may have at least one groove formed circumferentially about the central axis for receiving the belt. The laser infused friction material may be bonded to an outer surface of the at least one groove.

The laser infused friction material may be configured into a pattern on the outer surface of the at least one groove. The pulley may have at least three grooves. The pulley may have a diameter of about 1-10 inches, and more preferably between about 2-4 inches, and even more preferably about 2.5 inches.

In another aspect, a method of fabricating a pulley for transmitting rotational motion between first and second rotating shafts with a belt on an automobile engine is disclosed. The pulley may be fixed to the first rotating shaft. The method may comprise the steps of forming a body having a cylindrical central hole for receiving the first rotating shaft and mounting the body onto the first rotating shaft on the automobile engine, the cylindrical central hole defining a central axis about which the body rotates, the body having at least one groove formed circumferentially about the central axis for receiving the belt; covering an outer surface of the at least one groove with a powder material; and selectively applying heat from a laser beam to the powder material and the outer surface of the at least one groove to fuse the powder material to the outer surface of the at least one groove. The fused powder material provides a surface texture to increase its coefficient of friction and reduce slip with another material such as a belt.

The powder material used in the method may be a formulation sold under the trademark THERMARK or CERMARK. The powder material used in the method may also be any powdered metallic material or powdered oxide material. By way of example and not limitation, the metallic material may be tungsten, various types of carbides, cobalt, titanium, aluminum, steel or combinations thereof. The average size of the of the powdered material may be up to about 100 microns, and is preferably up to about 35 microns. More preferably, the powdered material is between about 2-25 microns. The texture of the fused material may be increased or decreased by respectively using larger or smaller sized powdered oxide material. Additionally, ceramic and/or diamond particles may be heterogeneously mixed in with the powdered metallic material or powdered oxide material.

The powder material and the outer surface of the at least one groove may reach a temperature of at least 200 degrees Fahrenheit depending on the specific powder material and the outer surface to fuse the powder material to the outer surface of the groove. By way of example and not limitation, the powder material may be configured so that the fusing temperature of the powder material and the outer surface may be as high as about 1,221 degrees Fahrenheit to about 4,566 degrees Fahrenheit for aluminum which are the respective melting and boiling points for aluminum. More broadly speaking, the heat applied to the powder material and the outer surface is regulated so that the temperature of the outer surface may reach between the melting point and the boiling point of the base material.

In the method, the covering step may include the step of covering the entire outer surface of the at least one groove.

In the method, the applying step may comprise the steps of mounting the body to a chuck; mounting the body and the chuck to a laser machine; rotating the body with the chuck while performing the applying heat from the laser beam step, rotational motion of the body defining a rotational axis; and traversing a head of the laser machine along the rotational axis while performing the applying heat from the laser beam step.

In another aspect, a method of removing a pulley from a rotating shaft of an automobile engine is disclosed. The method may comprise the steps of unscrewing a plurality of first bolts from the pulley to disassemble a first outer body of the pulley from an inner mounting fixture of the pulley; removing the first outer body from the inner mounting fixture; positioning a second outer body over the inner mounting fixture wherein an internal configuration of the second outer body is sized to interface with the inner mounting fixture and an external configuration of the second outer body is sized to mate with a puller; screwing the plurality of first bolts or a plurality of second bolts to the pulley to fix the second outer body to the inner mounting fixture wherein the second outer body has a larger flange compared to a flange of the first outer body; engaging the puller to the larger flange of the second outer body; and pulling on the larger flange of the second outer body with the puller to remove the inner mounting fixture from the rotating shaft.

In the method, the larger flange of the second outer body may be located on an inner side of the pulley.

In a different aspect, a method for increasing a coefficient of friction of a surface of a pulley is disclosed. The method may comprise the steps of disposing a laser machine adjacent to the pulley so that a laser beam of the laser machine is applied to an area of the surface of the pulley; adjusting the laser machine to a roughing setting to emit a laser beam that vaporizes the surface of the area to increase a roughness of the pulley surface; applying the laser beam of the laser machine onto the pulley surface with the laser machine set to the roughing setting; adjusting the laser machine to a smoothing setting to emit the laser beam to reduce sharps peaks on the pulley surface caused by the applying the laser beam of the laser machine set to the roughing setting; and applying the laser beam of the laser machine onto the pulley surface with the laser machine set to the smoothing setting.

The step of adjusting the laser machine to the smoothing setting from the roughing setting may comprise the steps of decreasing a kerf width, decreasing a fill distance and decreasing a power of the laser beam.

The step of adjusting the laser machine to the roughing setting may comprise the steps of setting a kerf width and setting a fill distance to be greater than the kerf width. The kerf width may be about between 0.0019 and about 0.004 inches. The step of adjusting the laser machine to the smoothing setting may comprise the steps of setting the fill distance to about double the kerf width but can be more or less depending on the material being worked on. By way of example and not limitation, the fill distance may be less than double the kerf width for aluminum and more than double the kerf width for 17-4 stainless steel.

The method may further comprise the step of adjusting the laser machine to an annealing setting to harden the pulley surface.

The method may further comprise the step of rotating the pulley or the laser machine after performing both applying steps to apply the laser beam of the laser machine about a circumference of the pulley.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 6 is a front view of a variable diameter pulley of a continuously variable transmission;

FIG. 7 is a front view of one of first and second parts of the variable diameter pulley individually mounted to a chuck;

FIG. 8 is a front view of one of first and second parts of the variable diameter pulley individually mounted to a chuck in a different orientation to a laser beam of a laser;

FIG. 14 is a table of settings of a laser;

DETAILED DESCRIPTION

Figure 1:
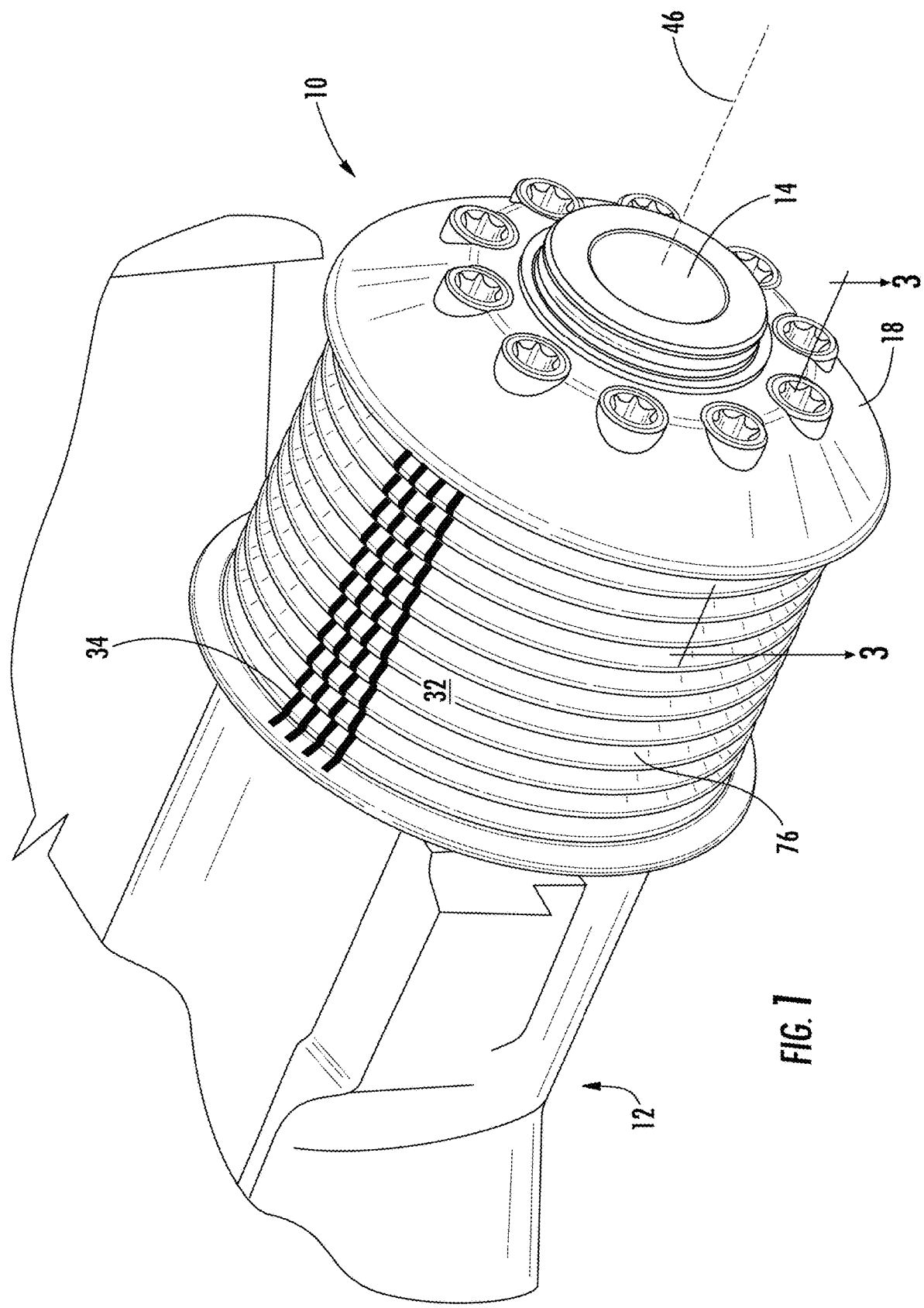
FIG. 1 is a perspective view of a pulley assembly mounted on a shaft of the supercharger.

Referring now to the drawings, a pulley assembly 10 for a supercharger 12 is shown. The pulley assembly 10 is mounted to a shaft 14 of the supercharger 12. The pulley assembly 10 may have three different components, namely, a shaft mount 16, a body 18 and a plurality of bolts 20. The body 18 is mounted to the shaft mount 16 with the plurality of bolts 20. In particular, each of the bolts 20 may have a shoulder 22 having an outer diameter 24 which is smaller than and within 0.001 inches of an inner diameter 26 of a neck 54 of a countersunk hole 28 formed in the body 18. The shaft mount 16 has a plurality of threaded holes 30 which receive the bolts 20. In this manner, the neck 54 of the body 18 aligns the body 18 to the shaft mount 16. Additionally, an outer surface 32 of the body 18 may have a plurality of friction lines 34 which mitigate slip between the outer surface 32 of the body 18 and a belt being driven by the pulley assembly 10 or driving the pulley assembly 10. The increased friction mitigates noise by reducing slippage between the belt and the pulley assembly 10.

Figure 2:
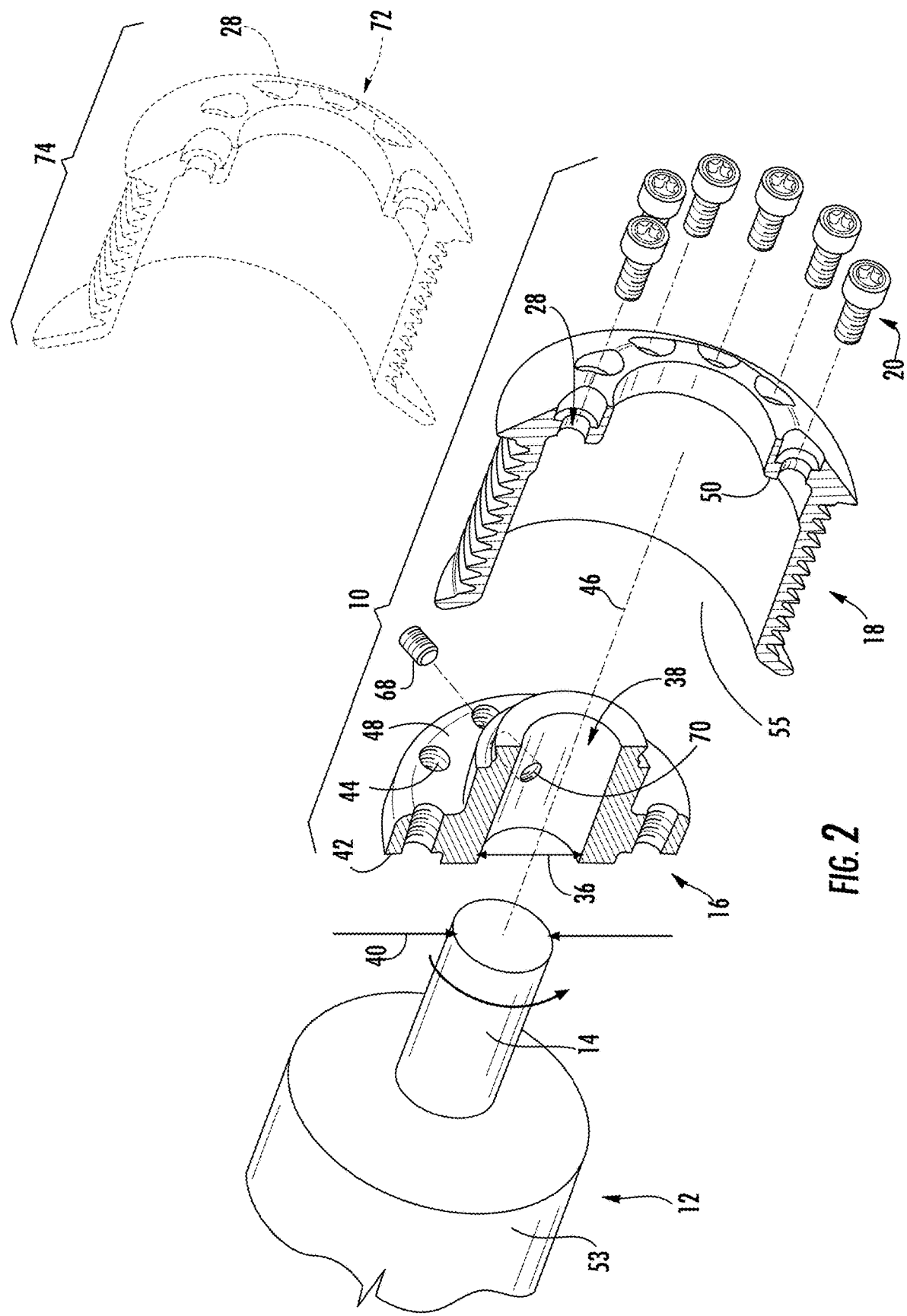
FIG. 2 is a cross-sectional exploded view of the pulley assembly shown in FIG. 1.

More particularly, referring now to FIG. 2, the pulley assembly 10 is made up of at least the shaft mount 16, the body 18 and the plurality of fasteners or bolts 20. To mount the pulley assembly 10 to the shaft 14 of the supercharger 12, the shaft mount 16 is heated to a temperature above the temperature of the shaft 14. The inner diameter 36 of the hole 38 of the shaft mount 16 is enlarged due to the heat so that the shaft mount 16 may be slid over the shaft 14. When the shaft mount 16 cools down, the shaft mount 16 is fixedly secured to the shaft 14 of the supercharger 12. The inner diameter 36 of the hole 38 of the shaft mount 16 is slightly smaller than an outer diameter 40 of the shaft 14 when the shaft 14 and the shaft mount 16 are at the same temperature. The shaft mount 16 compresses on the shaft 14 when the temperature of the shaft mount 16 reaches the temperature of the shaft 14.

The shaft mount 16 may have a flange 42 that extends outwardly around a periphery of the shaft mount 16. The flange 42 may have a plurality of threaded holes 44 symmetrically disposed about a central axis 46. The flange 42 may have a proximal surface 48 which mates with a distal surface 50 of the body 18. The body 18 is mounted to the shaft mount 16 with the plurality of fasteners 20. The body 18 has a set of corresponding countersunk holes 28 that receive the bolts 20. These countersunk holes 28 are aligned in the same pattern as the threaded holes 44 formed in the flange 42 of the shaft mount 16. The body 18 has an inner cavity 55 which is large enough to receive the shaft mount 16 and a portion 53 of the supercharger 12 that holds the shaft 14. The body 18 is disposed over the shaft mount 16 and the countersunk holes 28 are aligned to the threaded holes 44. Each of the fasteners 20 are then inserted through the countersunk holes 28 and engage to the threaded holes 44 of the shaft mount 16. The fasteners 20 fixedly secure the body 18 the shaft mount 16. Also, the interference fit between the hole 38 of the shaft mount 16 and the shaft 14 of the supercharger 12 fixedly secure the shaft mount 16 to the shaft 14.

Figure 3:
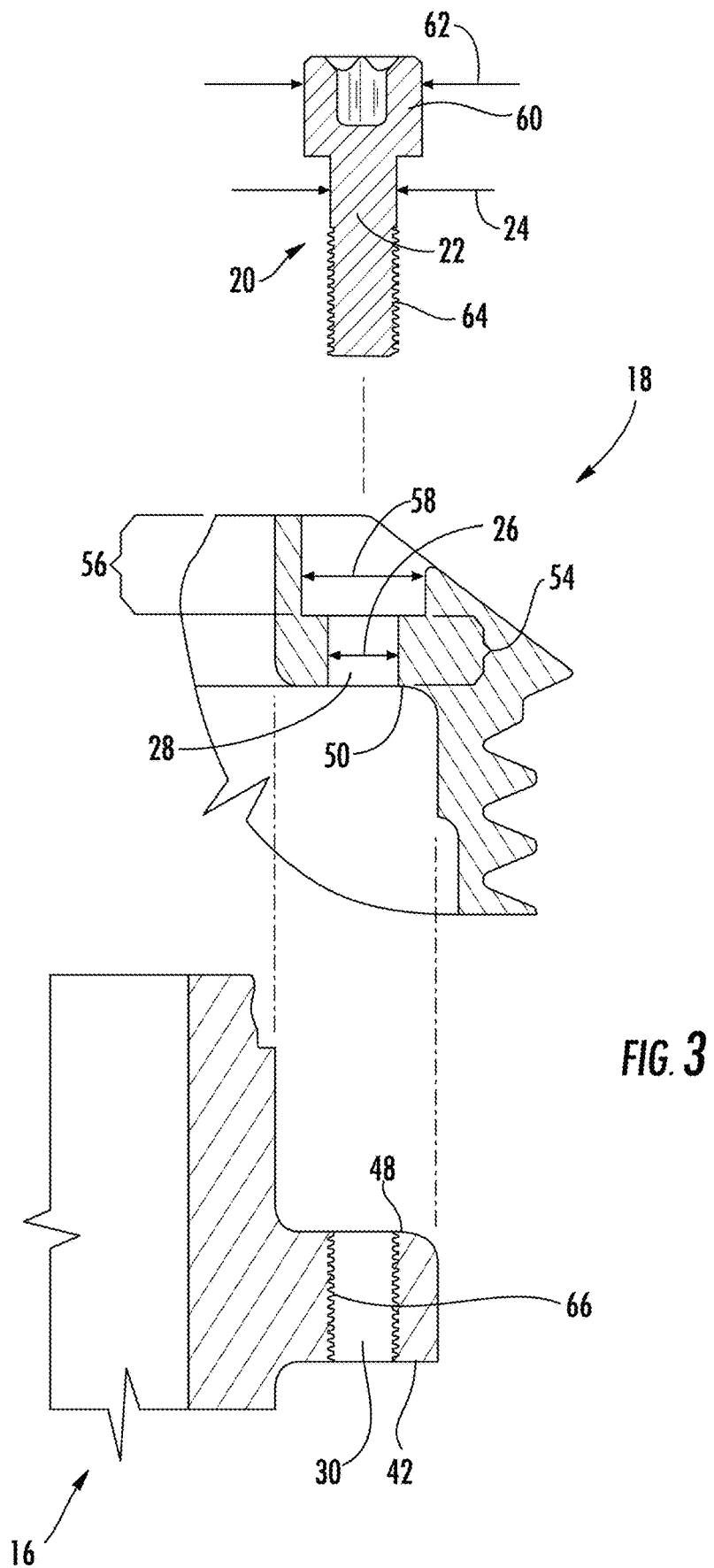
FIG. 3 is a cross-sectional view of the pulley assembly illustrating a bolt that aligns a body of the pulley assembly to a shaft mount of the pulley assembly.

To align the body 18 to the shaft mount 16, the bolts 20 have a shoulder 22 that mates to a neck 54 of the countersunk hole 28 formed in the body 18. In particular, referring now to FIG. 3, a cross-sectional view of the pulley assembly 10 is shown. The countersunk hole 28 has two different diameters. A first diameter at a neck 54 identified as inner diameter 26. A second diameter at a countersunk portion 56 identified as inner diameter 58. The inner diameter 58 receives a head 60 of the bolt 20. More particularly, the inner diameter 58 is significantly larger than an outer diameter 62 of the head 60 of the bolt 20. In contrast, the inner diameter 26 of the neck 54 of the threaded hole 28 is only minimally larger than an outer diameter 24 of the neck portion 22 of the bolt 20. More particularly, the inner diameter 26 is within 0.001 inches of the outer diameter 24 of the neck 22 of the bolt 20. As the threads 64 of the bolt 20 engage the threads 66 of the threaded hole 30 of the flange 42 of the shaft mount 16, the shoulder 22 of the bolt 20 enters the neck 54 of the hole 28 of the body 18. Since the inner diameter 26 of the hole 28 is within 0.001 inches to the outer diameter 24 of the shoulder 22, the body 18 begins to align to the shaft mount 60 as two or more bolts 20 engage the threaded holes 44 of the shaft mount 16.

Optionally, to further secure the shaft mount 16 to the shaft 14, the shaft mount 16 may have one or more socket set screws 68 that engage the shaft 14. In particular, the shaft mount 16 may have an extended length. A threaded hole 70 may be formed in the extended length. Preferably, a plurality of threaded holes 70 are symmetrically formed about the central axis 46 to maintain rotational balance of the pulley assembly 10 during rotation. By way of example and not limitation, threaded holes 70 may be placed on opposed sides of the central axis 46. Alternatively, three holes 70 may be disposed 120° apart from each other about the central axis 46 or four holes may be disposed 90° apart from each other about the central axis 46. After the shaft mount 16 is mounted to the shaft 14, the socket set screws 68 are threaded into the threaded holes 70 and engaged to the shaft 14. Preferably, the socket set screws 68 have a knurled end to further engage the shaft 14.

To mount the pulley assembly 10 to the shaft 14 of the supercharger 12, the shaft mount 16 (see FIG. 2) is heated to a temperature above the temperature of the shaft 14 of the supercharger 12. In doing this, the heat enlarges the inner diameter 36 of the shaft mount 16 so that the inner diameter 36 of the shaft mount 16 when heated is greater than the outer diameter 40 of the shaft 14. While the shaft mount 16 is heated to an elevated temperature, the shaft mount 16 is placed over the shaft 14 so that the shaft 14 is now disposed within the hole 38 of the shaft mount 16. As the shaft mount 16 cools down, the inner diameter 36 of the shaft mount 16 decreases. When the temperature of the shaft mount 16 is equal to the temperature of the shaft 14, the inner diameter 36 of the shaft mount 16 is equal to the outer diameter 40 of the shaft 14. Since the inner diameter 36 of the shaft mount 16 is less than the outer diameter 40 of the shaft 14 (when the shaft mount 16 and the shaft 14 are at the same temperature and the shaft mount 16 is not mounted to the shaft 14), the inner surface defining the inner diameter 36 of the shaft mount 16 compresses upon the outer surface of the shaft 14 when the shaft mount 16 is mounted to the shaft 14 of the supercharger 12.

To further ensure that the shaft mount 16 is retained on the shaft 14, socket set screws 68 may be threaded into the threaded holes 70 formed in the extended length of shaft mount 16. A distal tip of each of the socket set screws 68 may have knurls to further engage the shaft 14 and mitigate inadvertent movement between the shaft mount 16 and the shaft 14.

The body 18 is then disposed over the shaft mount 16 so that the shaft mount 16 is disposed within the cavity 55 of the body 18. The bolts 20 are inserted through the countersunk holes 28 of the body 18 and threadedly engaged to the threaded holes 44 formed in the flange 42 of the shaft mount 16. As the bolts 20 are tightened, the neck 54 of the bolts 20 seat into the neck 54 of the body 18. Due to the tight tolerances between the shoulders 22 of the bolts 20 and the necks 54 of the countersunk holes 28 of the body 18, the body 18 begins to align to the shaft mount 16. The user tightens the bolts 20 to securely attach the body 18 to the shaft mount 16, and in turn, to the shaft 14 of the supercharger 12.

To remove the pulley assembly 10 from the shaft 14 of the supercharger 12, the user loosens the bolts 20 to remove the body 18 from the shaft mount 16. The purpose of removing the body 18 from the shaft mount 16 is to provide the user with access to the socket set screws 68, if used. The user loosens and removes the socket set screws 68 from the shaft mount 16. The user may then reinstall the original body 18 or install a sacrificial body 72 (see FIG. 2). The sacrificial body 72 may incorporate the counter sunk holes 28 and an enlarged distal flange 74. The enlarged distal flange 74 is used to pull the body 18 and shaft mount 16 off of the shaft 14. The user may then pull the pulley assembly 10 from the shaft 14 with the puller.

Referring back to FIG. 1, the body 18 of the pulley assembly 10 may have an outer surface 32. The outer surface 32 may have a plurality of grooves 76 circumscribing the body 18 about the rotational axis 46. In the embodiment shown in the figures, the pulley assembly 10 has a plurality of grooves. However, it is also contemplated that the various aspects described herein may be applied to a pulley have a single groove or a pulley or tensioner having a cylindrical surface. The outer surface 32, and in this instance, the grooves 76 engage a belt that wraps around the body 18 and fits within the grooves 76. The outer surface 32 of the body 18 may be smooth so that during use, the belt wrapped around the body 18 may inadvertently slip so that the linear speed of the outer surface 32 of the body 18 is not equal to the linear speed of the belt driving or driven by the pulley assembly 10. To mitigate slippage between the belt and the outer surface 32 of the body 18, friction patches or lines 34 may be formed on the outer surface 32 of the body 18. Although the friction patches or lines 30 or described as being applied to the pulley assembly 10, the friction patches or lines 34 may be applied in the same manner, with the same materials and machines and the same methods to a grip 300a, b, frame 302, slide 306, rail 308 of a firearm 310a, b (e.g., handgun or rifle). The goal is to provide better purchase on the firearm 310a, b.

Figure 4:
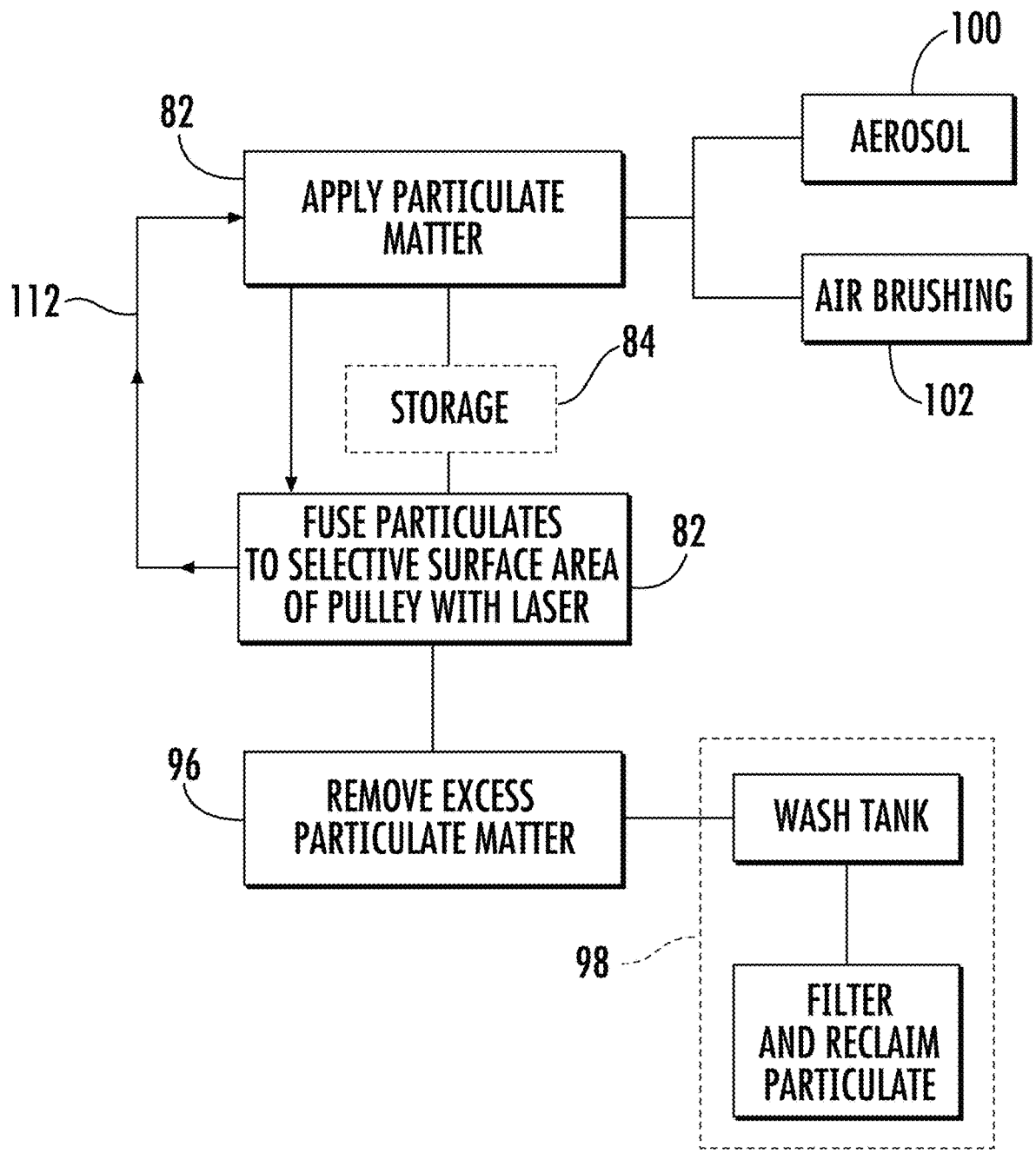
FIG. 4 is a flowchart for forming friction lines on an outer surface of the body of the pulley assembly.
Figure 5:
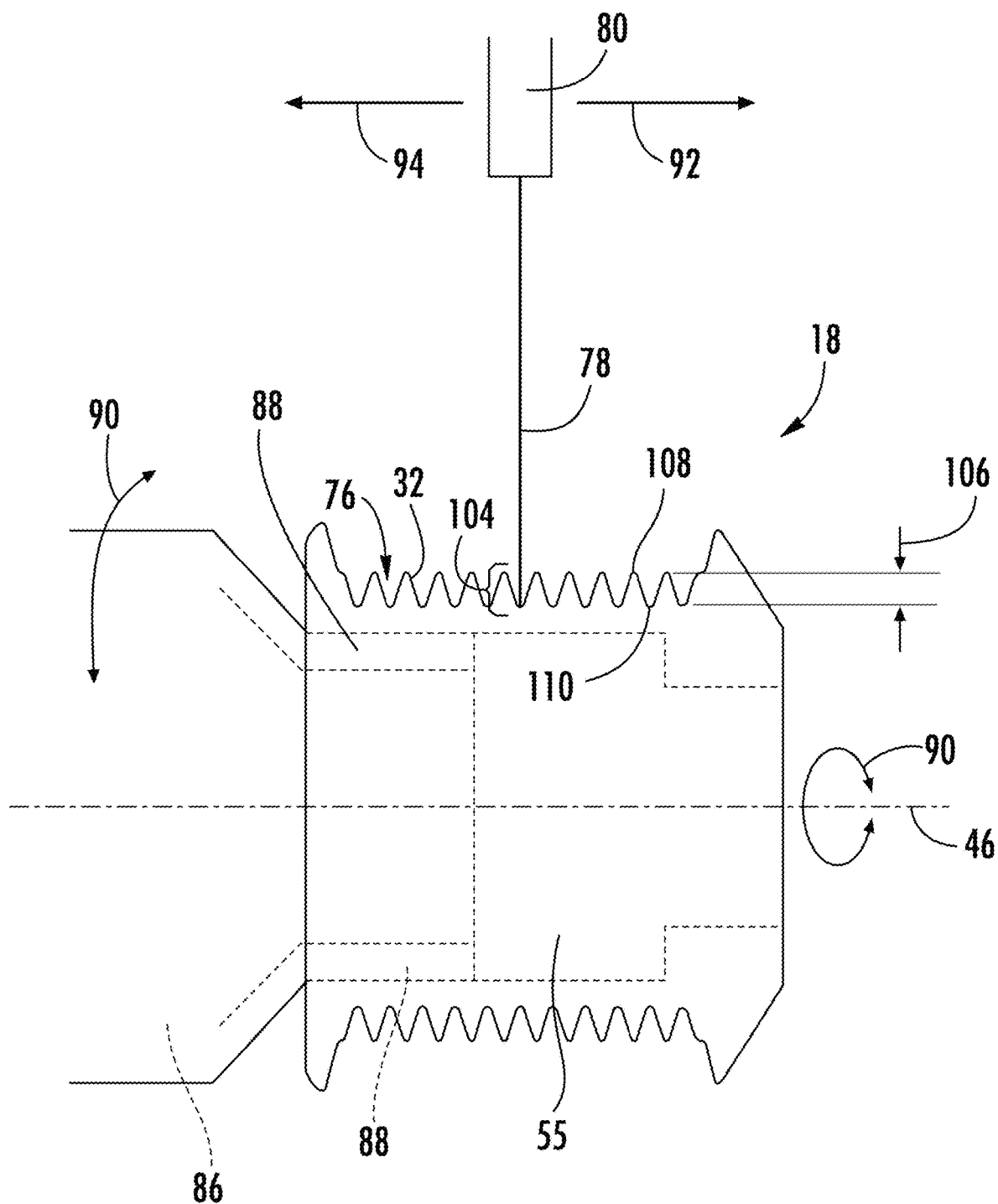
FIG. 5 illustrates a laser beam used to fuse particulate matter on the outer surface of the body of the pulley assembly for forming the friction lines.

In particular, referring now to FIGS. 4 and 5, particulate matter or substance may be fused to the outer surface 32 of the body 18 and have a coefficient of friction with the belt greater than the coefficient of friction between the smooth outer surface 32 of the body 18 and the belt. The particulate matter may be coated over the outer surface 32. A laser beam 78 of the laser 80 may be directed to selective locations on the outer surface 32 of the body 18 to fuse the particulate matter to the outer surface 32 of the body 18. Preferably, the particulate matter when fused to the outer surface 32 has a coefficient of friction with the belt greater than the coefficient of friction between the smooth outer surface 32 of the body 18 and the belt. Moreover, the particulate matter provides a slight raised surface so that the edges of the friction lines 38 create additional friction between the friction lines 34 and the belt. The fusing of the particulate matter to the outer surface 32 of the body 18 is a physical bonding process wherein the particulate matter is heated and permanently bonded to the outer surface 32 of the body 18.

To coat the particulate matter onto the outer surface 32 of the body 18, the particulate matter is applied 82 (see FIG. 4) to the outer surface 32 of the body 18. The particulate matter may be applied 82 to the outer surface 32 of the body 18 either by way of an aerosol 100 or airbrushing 102. If the particulate matter is delivered or coated onto the outer surface 32 of the body 18 with an aerosol 100, the aerosol can 100 is purchased in a prepackaged form. The user sprays the entire outer surface 32 of the body 18, and more particularly, sprays the grooves 76. In the event that the particulate matter is formed on the rail 308, slide 306 or metallic part of the firearm, the particulate matter may be disposed (e.g., sprayed or coated) at select locations thereon in order to increase purchase of the firearm by the user. If the particulate matter is delivered or coated onto the outer surface 32 of the body 18 by way of airbrushing 102, the particulate matter is mixed with denatured alcohol then sprayed on the outer surface 32 with a sprayer. Two types of particulate matter may be utilized when air brushing. A first type is one sold under the trademark Thermark. A second type is one sold under the trademark Cernark. For low production runs, the Thermark particulate matter is preferred since un-fused particulate matter on the outer surface 32 is easily removed by wiping with a damp wet rag. However, for large production runs, Cernark is preferred since the particulate matter may be applied to the outer surface 32 of the body 18 and stored for an extended period of time.

If Thermark is used, then the user applies the particulate matter shortly before fusing 82 the particulate matter to the outer surface 32 of the body 18. If Cernark is used, then the user may optionally store 84 the coated bodies 18 in storage for an extended period of time. When desired, the user takes the coated bodies 18 out of storage and fuses 82 the particulate matter to the outer surface 32 of the body 18. Regardless of whether Thermark or Cernark is utilized, the particulate matter may be fused 82 to the outer surface 32 (or slide 306 or rail 308 of the firearm 310a, b) of the body 18 with a laser beam 78. The laser beam 78 heats up the particulate matter and the outer surface 32 of the body 18. The heat permanently attaches the particulate matter to the outer surface 32 of the body 18 so that the particulate matter does not rub off as the belt runs over the outer surface 32 of the body 18.

Generally, the particular matter may be provided as a powder. The powder may be delivered by aerosol or a spray gun. The material of the powder may be a metallic material. More particularly, the powder may be any form of a metallic oxide material. By way of example and not limitation, the metallic material may be tungsten, carbides (e.g., tungsten carbide, titanium carbide, silicon carbide, carbide.c++, calcium carbide, boron carbide), cobalt, titanium, aluminum, steel or combinations thereof. The average size of the of the powdered material may be up to about 100 microns, and is preferably up to about 35 microns with a minimum size being 2 microns. The texture of the fused material may be increased or decreased by respectively using larger or smaller sized powdered oxide material. During tests, a powder metallic oxide material having a size of about 35 microns has created a 0.007 inch texture to the outer surface 32.

To form the friction lines or patches 34, the body 18 (or slide 306 or rail 308) may be attached to a chuck 86 after applying the particulate matter to the outer surface 32. The chuck 86 may have a plurality of arms 88 with serrated teeth. The plurality of arms 88 may be inserted within the internal cavity 55 of the body 18 and expanded outward. Upon outward expansion, the arms 88 automatically center the body 18 onto the chuck 86. The chuck 86 and the body 18 are placed on a rotary table or an indexer that controls the rotational movement 90 of the chuck 86 and the body 18 about rotational axis 46. The laser 80 is capable of traversing longitudinally along the central or rotational axis 46 in the direction of arrows 92, 94. Preferably, the laser beam 78 of the laser 80 intersects and is perpendicular to the central or rotational axis 46. Additionally, the laser 80 may be a direct beam laser 80.

The laser beam 78 may be traversed longitudinally along the axis 46 and simultaneously, the body 18 may be rotated about axis 46 so that the laser beam 78 traces the pattern of lines, circles, curves, patches and other shapes to form a mark, word, pattern on the outer surface 32 of the grooves of the body 18. In FIG. 1, the friction lines 34 are shown as being linear along the longitudinal length of the central axis 46. However, other types of patterns and shapes are also contemplated.

After fusing 82, the particulate matter to the outer surface 32 of the body 18, the excess particulate matter which is not fused to the outer surface 32 of the body 18 may be removed 96 and reclaimed 98 for subsequent use. More particularly, the body 18 may be placed in a wash tank such as an ultrasonic tank. Fluid within the ultrasonic tank is heated up to 200° F. and the tank is vibrated. The fluid is run through a filter and the particulate matter that was not fused to the body 18 is reclaimed 98 and reused at a later time.

The direct beam laser 80 produces a laser beam 78 having a focal depth 104. Preferably, the focal depth 104 is greater than a distance 106 between a peek 108 and valley 110 of the grooves 76 formed in the body 18. The laser 80 and laser beam 78 are positioned so that the focal depth 104 covers the entire distance 106. By way of example and not limitation, the focal depth 104 of the laser beam 78 may be about 0.200 inches. In this manner, the laser beam 78 heats up the particulate matter and the surface 32 along the entire height of the grooves 76 to provide optimal friction lines 34.

It is also contemplated that the process of forming the friction lines 34 as discussed above and in relation to FIGS. 4 and 5 may be repeated over existing friction lines 34 as shown by process line 112 (see FIG. 4). In particular, after fusing 82, the particulate matter to the surface 32 of the body 18, additional particulate matter may be applied 82 to the outer surface 32 of the body 18. The additional particulate matter may be fused 82 to the layer of fused particulate matter and to the bare metal of the body 18. The process may be repeated to increase the thickness of the layers of particulate matter on the outer surface 32 of the body 18.

Other types of lasers 80 may also be utilized to fuse 82 the particulate matter to the outer surface 32 of the body 18. By way of example and not limitation, a Galvo laser which utilizes one or more lenses to position the laser beam 78 on the outer surface 32 of the body 18 may be utilized. In this manner, the throughput is higher than a direct laser beam 78 or a CO2 laser beam in that the lenses can create multiple friction lines 34 in one pass.

The process of forming the friction lines 34 is discussed in relation to FIGS. 4 and 5 with the process of producing an emboss on the outer surface 32 of the body 18 (or slide 306 or rail 308). However, it is also contemplated that a deboss may be formed on the outer surface 32 of the body 18 (or slide 306 or rail 308) by removing material. In particular, the Galvo laser may be utilized to remove material from the outer surface 32 of the body 18. The Galvo laser utilizes one or more lenses to redirect the laser beam 78 instead of moving the laser head 80 to position the laser beam 78 on the outer surface 32 of the body 18. The deboss may also be formed on a polymer frame firearm 310*a* or plastic grip 300*b*.

In addition to forming the deboss on the outer surface 32 with the laser 80, it is also contemplated that the deboss may be formed with a micro end mill. The same is true if the deboss was formed on the firearm or parts thereof. Regardless of whether the deboss is formed with a laser 80 or a micro end mill, the body 18 (or firearm or parts thereof) is mounted to the chuck 86. The chuck 86 and the body 18 are mounted to an indexer or a rotary table which controls the rotational angle of the body 18 as the micro end mill or the laser 80 removes material from the outer surface 32 of the body 18. In another aspect, it is also contemplated that the body 18 may remain stationary while the micro end mill or the laser 80 both rotate about the body 18 and also traverse longitudinally along the axis 46.

The friction lines or patches 34 were described as being formed on a rotary table or indexer that is coordinated with the laser. However, it is also contemplated that the friction lines or patches 34 may be formed manually. By way of example and not limitation, the part could be mounted to a chuck or a holding mechanism that the user may move by hand.

In another aspect, referring now to FIG. 6, the friction lines or patches may be formed on other types of pulleys, and also on tensioning rollers having a cylindrical flat surface. By way of example and not limitation, the friction lines or patches 34 may be formed on inner surfaces 118 of first and second parts 120, 122 of a variable diameter pulley 124 of a continuously variable transmission. When the belt 126 is closer to the rotational axis 128, the revolutions per minute of the pulley 124 is higher than when the belt 126 is further away from the rotational axis 128.

Referring now to FIG. 7, to form the friction lines or patches 34 on the inner surface 118, the first and second parts may each be individually mounted to the chuck 86. The part 120 or 122 is positioned with the inner surface 118 perpendicular to the laser beam 78. The form the patch or lines 34, the laser 80 is traversed laterally in the direction of arrows 92 and 94 and the chuck 86 is rotated in direction of arrow 90 about rotating axis 46.

Referring now to FIG. 8, a different set up between the part 120, 122 and the laser beam 78 is shown. Instead of the part 120, 122 being oriented so that the laser beam 78 is perpendicular to the inner surface 118, the inner surface 118 may be oriented at a skewed angle with respect to the laser beam 78. In FIG. 8, the rotational axis of the part 120, 122 is set up so as to be perpendicular to the laser beam 78. Since the laser beam 78 has a particular focal depth 104 which is the location of the laser beam effective for heating up the particular matter and the inner surface 118 to fuse the two together, the laser 80 cannot simply be laterally traversed in a linear as shown in FIG. 7 if the angle of the inner surface 118 is too large so that the entire surface 118 is within the focal depth 104 of the laser beam. If the laser is moved to the left 94 or right 92, the laser beam 78 is effective at fusing the particulate matter to the inner surface 118 as long as the inner surface 118 is within the focal depth of the laser beam. Right before the inner surface 118 comes out of the focal depth of the laser beam 78, the laser may be traversed up 128 or down 130 to reposition the focal depth of the laser beam on the inner surface 118. To form the friction lines or patches 34, the laser 80 is traversed sideways 92, 94 and vertically 128, 130 in a staggered fashion. This technique can also be used for pulleys that have a deep groove wherein the distance 106 between the peak 108 and the valley 110 of the deep groove is greater than the focal depth 104 of the laser beam 78.

Referring now the FIGS. 9-13, a method and apparatus for forming the deboss on the outer surface 32 of the body 18 in order to increase a coefficient of friction of the outer surface 13 of the body 18 is shown. The same method and apparatus may be the deboss on a firearm, grip 300*a, b*, slide 306 or rail 308. In particular, the laser beam 78 of the laser 80 may create a plurality of kerfs 150 (see FIG. 12). These kerfs 150 form the deboss on the outer surface 32 of the body 18. This is accomplished with a roughing pass of the laser beam 78 on the outer surface 32 of the body 18. Additional passes of the laser beam 78 on the outer surface 32 of the body 18 may be made for different purposes. These additional passes may be a smoothing pass wherein excessively sharp protrusions formed during the roughing pass are rounded out or knocked down and an annealing pass which raises the temperature of the surface 32 of the body 18 in order to harden the outer surface 32 of the body 18 and/or recast material 166 formed during the roughing pass. More particularly, the laser 80 may perform 1) the roughing pass, 2) smoothing pass, 3) the roughing and smoothing passes, 4) the roughing, smoothing and annealing passes or 5) the annealing pass on the outer surface 32 of the body 18.

Figure 9:
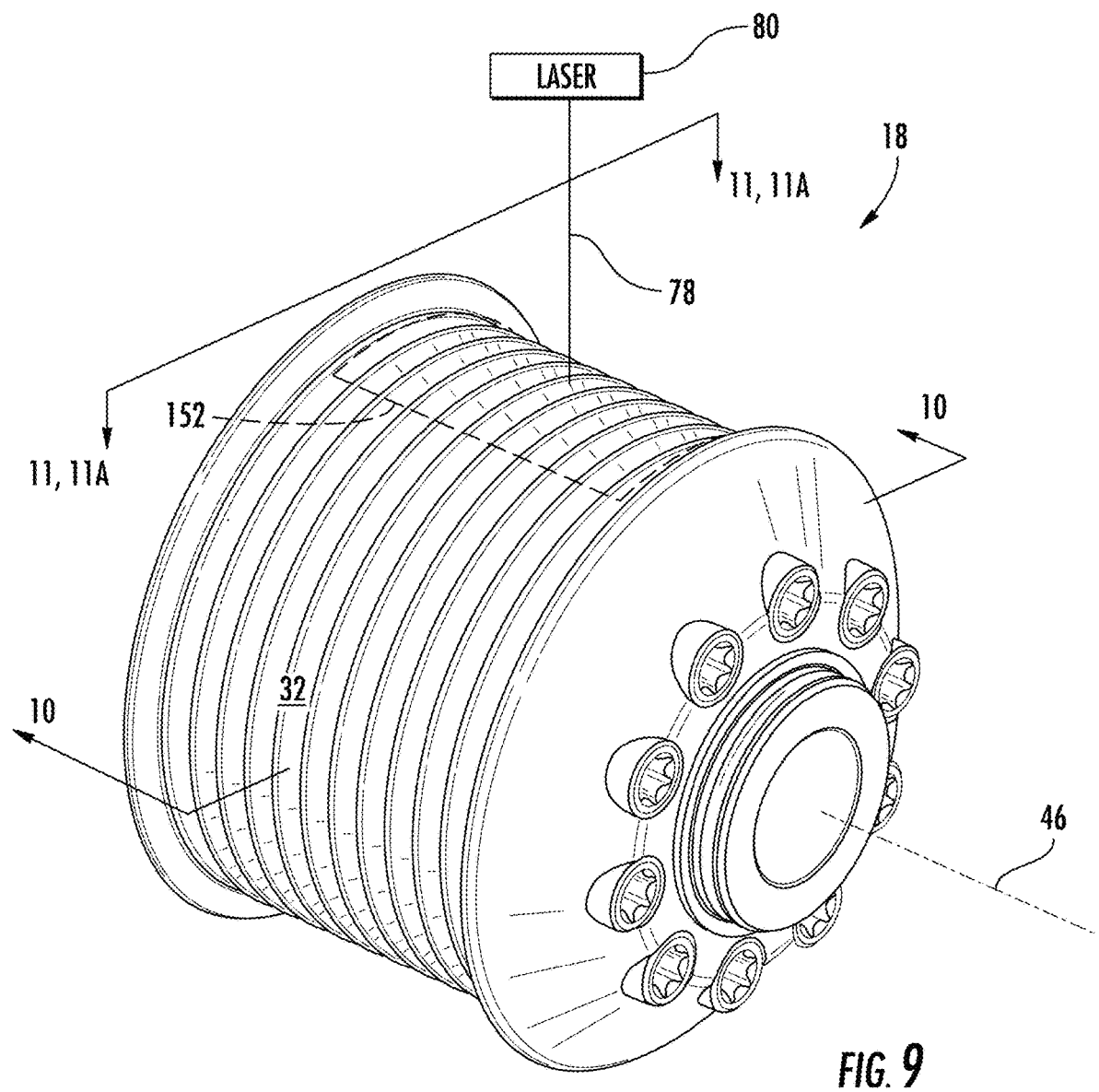
FIG. 9 is a perspective view of the pulley assembly having an outer surface debossed with a laser to increase a coefficient of friction of the outer surface.

As shown in FIG. 9, the laser 80 is disposed above the body 18 having the surface 32 on which the deboss which increases the coefficient of friction is to be formed. A direction of the laser beam 78 can be controlled by lenses and mirrors in order to cover an area 152 of the outer surface 32 of the body 18. Due to the curvature of the outer surface 32, the laser beam cannot cover the entire outer surface 32 of the body 18. The body 18 may be rotated about central axis 46 or the laser 80 may be rotated about the body 18 with respect to the central axis 46 in order to deboss the entire circumference of the body 18. The same applies if the deboss was formed on a firearm, grip 300a, b, slide 306 or rail 308. Preferably, the body 18 and the laser 80 are stationary while the laser beam 78 is performing one or more of the roughing pass, smoothing pass and annealing pass on the area 152 being worked on by the laser beam 78 of the laser 80. After the laser beam 78 works the area 152 with one or more of the roughing pass, smoothing pass and annealing pass, either the laser 80 and/or the body 18 rotates so that the laser beam 78 can work one or more of the passes on a different area 152 on the circumference of the outer surface 32 of the body 18.

Figure 10:
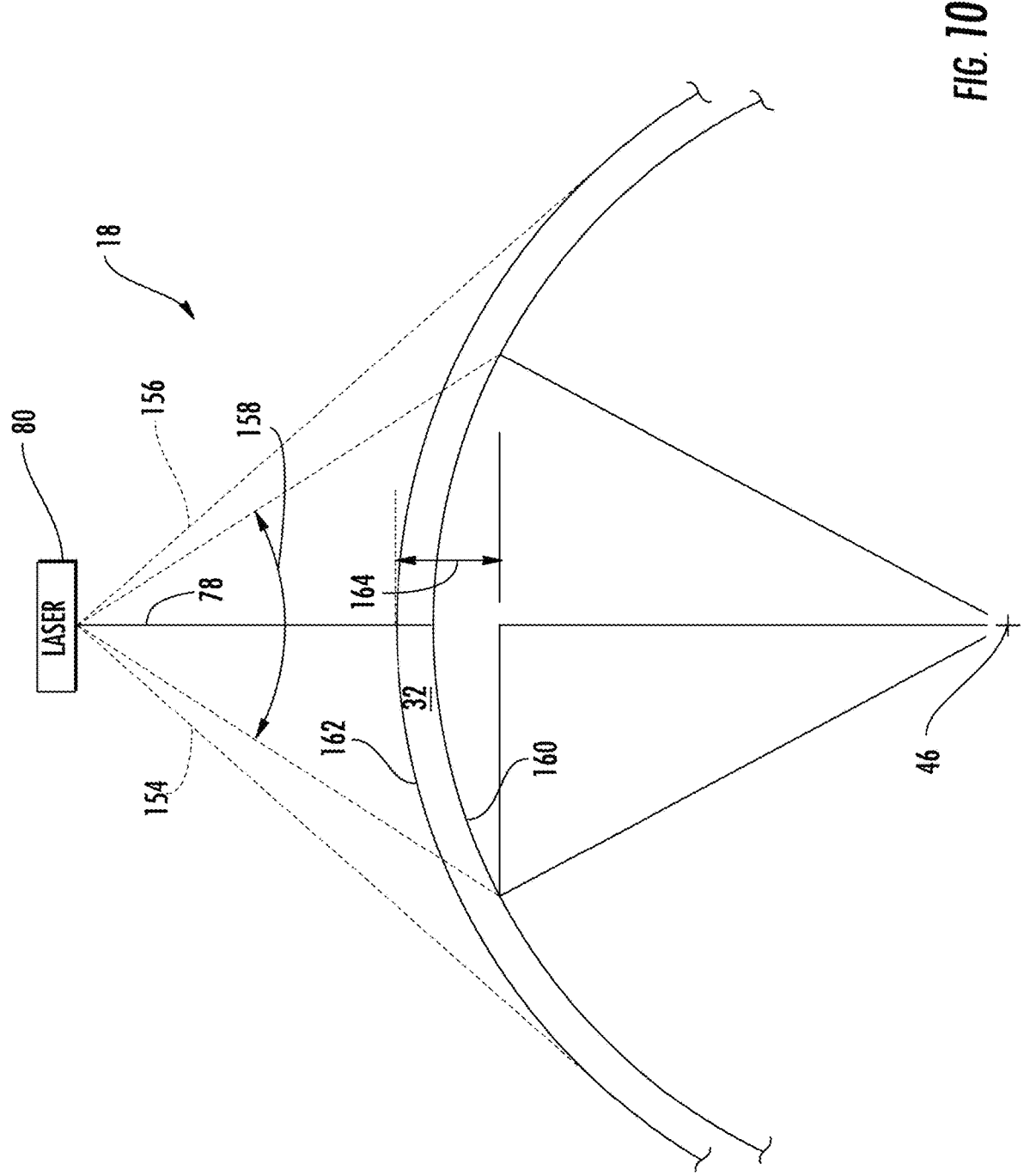
FIG. 10 is a cross-sectional view of the pulley assembly shown in FIG. 9.
Figure 11:
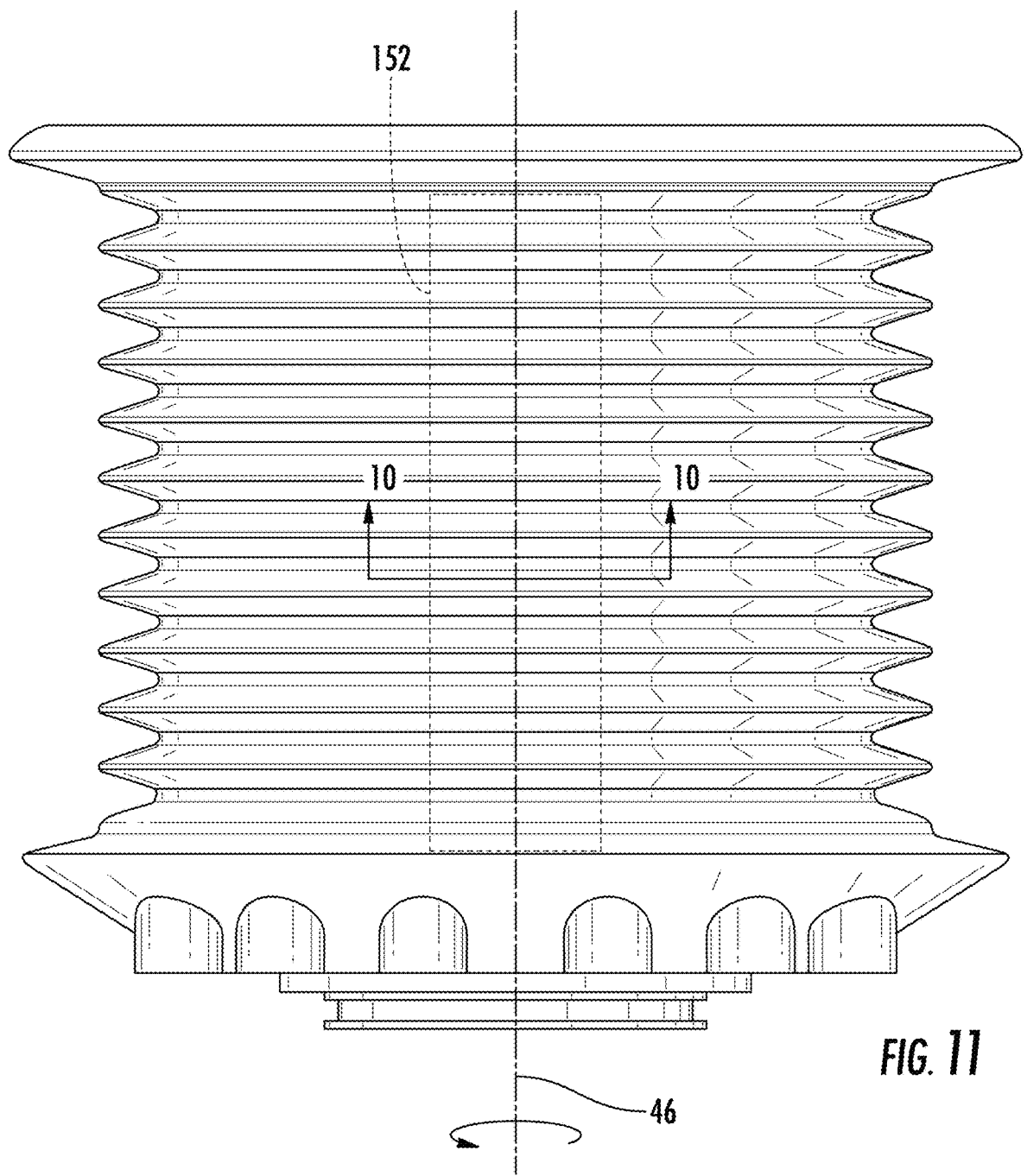
FIG. 11 is a top view of the pulley assembly shown in FIG. 9.

Referring now to FIG. 10, a cross-sectional view of the body 18 shown in FIG. 9 with respect to the laser 80 is shown. Preferably, the laser beam 78 is centrally aligned to the central rotational axis 46 of the body 18 (or firearm, grip 300a, b, slide 306 or rail 308) in that the laser beam 78 is not skewed. The laser beam 78 may be skewed to the left or right as shown in dashed lines 154, 156 as well as along a length of the central axis 46. Theoretically, the laser beam 78 may be skewed to the left 154 or right 156 so that the laser beam 78 is tangent to the left and right sides of the body 18. However, at such an excessive skewed angle, the power of the laser beam 78 is less or non-effective. As such, the laser beam 78 is skewed to the left and right 154, 156 to a smaller angle 158 so that the focal depth or depth of field 164 of the laser beam 78 coincides with or encompasses the outer surface 32 of the body 18 at a valley 160 and peak 162 of a groove formed on the body 18. The body 18 shown in FIGS. 9-11 is that of a pulley having a plurality of grooves that define the valley and peaks 160, 162. However, the method and apparatus for forming the deboss may be used on a variety of other surfaces including but not limited to a pulley having a single groove such as one that is incorporated into a continuously variable transmission (CVT) or a flat idler pulley. More broadly speaking, the method and apparatus for forming the deboss may be used on any surface that contacts a belt or requires an increased coefficient of friction. Likewise, the laser beam 78 is skewed to the left and right 164, 156 to a smaller angle 158 so that the focal depth or depth of field 164 of the laser beam 78 coincides with and encompasses the outer surface 32 of the body 18. For the flat idler pulley, there are no valleys and peaks. As such, the curvature of the pulley is accounted for in determining the acceptable angle 158. For a CVT, the laser beam 78 may be applied to the surface 118 by forming the deboss on the first and second parts 120, 122 separately as discussed above during the emboss process. In particular, the laser debosses the first part and the second part separately which are then assembled together at a later time.

Figure 11A:
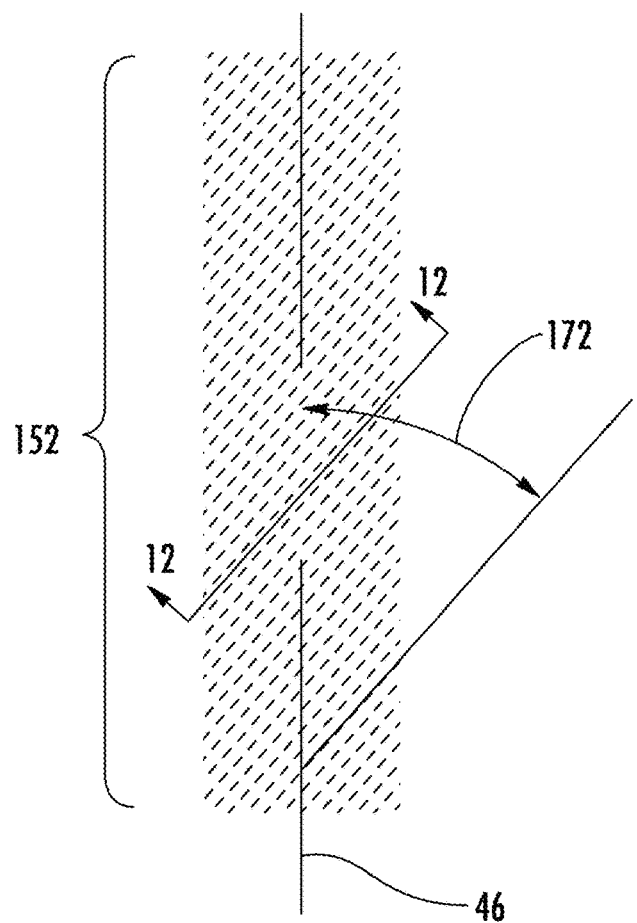
FIG. 11A is a top view of a crosshatching pattern formed on an area of the outer surface the pulley assembly.

Referring now the FIG. 11A, a top view of the area 152 which is worked by the laser beam 78 of the laser 80 is shown. In this regard, the laser beam creates a series of straight line dashes at an angle 172 with respect to the central axis 46 of the body 18. In FIG. 11A, the grooves of the pulley are not shown for clarity. Also, FIG. 11A is a top view of only the area 152 worked by the laser beam 78 of the laser 80. The laser beam 78 can be adjusted to pass over the area 152 at different angles. By way of example and not limitation, the preferred angles are 0° 30°, 45°, 60°, 90°, 120°, 125°, 150°. These angles are known as the crosshatching angles 172. The laser beam 78 of the laser machine 80 creates a series of parallel short line dashes. A distance between the short line dashes is referred to as a crosshatching size 174 (see FIG. 12). The laser beam 78 may be adjusted to run at a particular speed measured in inches per second.

Figure 12:
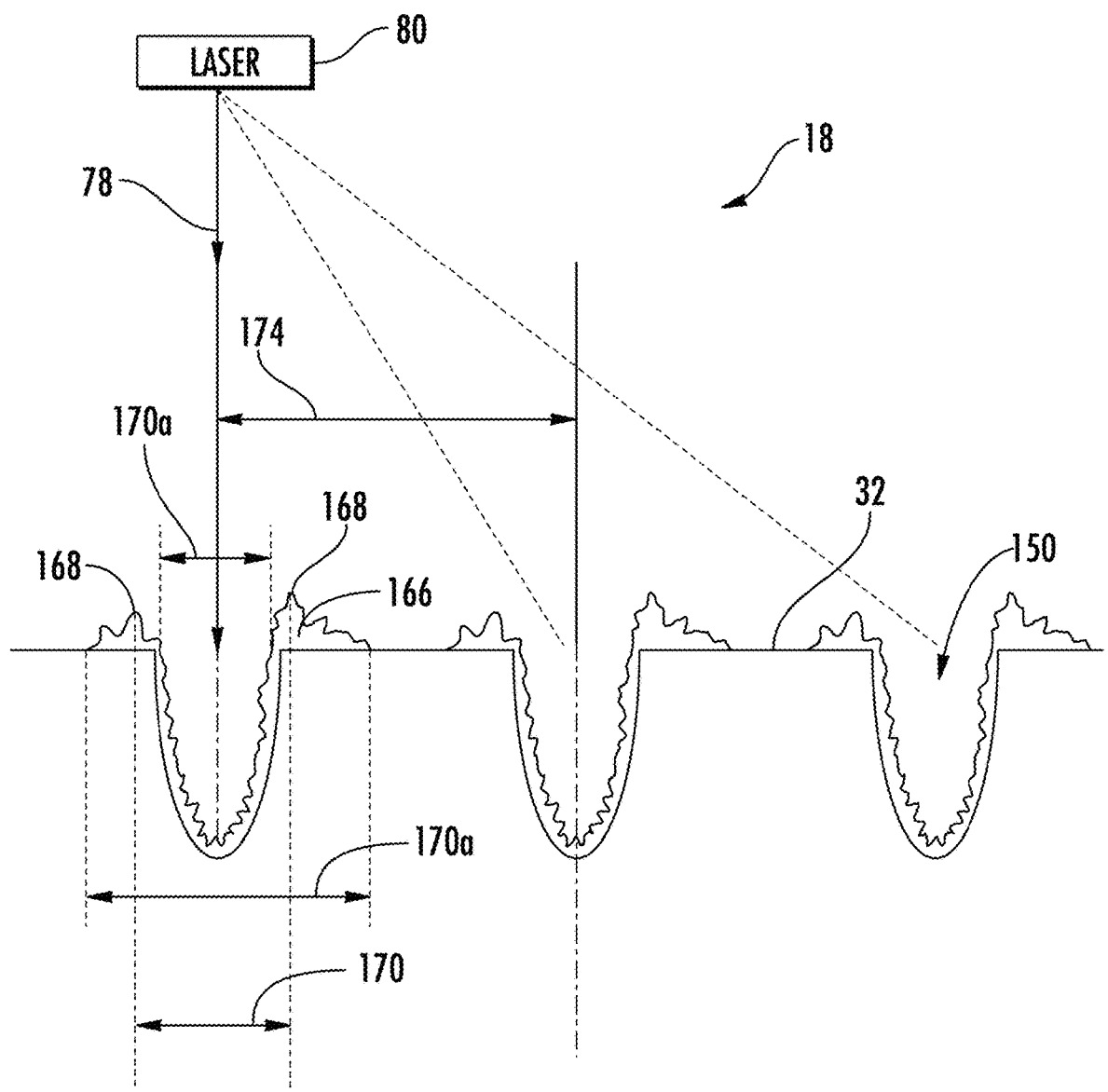
FIG. 12 is a cross-sectional view of the outer surface illustrating a plurality of kerfs formed by the laser beam of the laser.

Referring now to FIG. 12, the laser 80 is shown emitting a laser beam 78 onto the outer surface 32 the body 18 (or a firearm, grip 300a, b, slide 306 or rail 308). The laser beam 78 vaporizes the outer surface 32 in order to create an indentation or a kerf 150. This is the deboss formed by the laser beam 78. When the laser beam 78 vaporizes a portion of the outer surface 32 of the body 18, recast material 166 lines an interior of the kerf 150 and also extends outward above the outer surface 32 of the body 18. The outward extensions are shown by peaks 168 of the recast material 166. The kerf 150 is defined by a width 170 at the peaks 168. It is also contemplated that the kerf width 170 may be measured at the outer surface 32 including the recast material 166 as shown by dimension line 170a. The kerfs 150 are shown in FIG. 12 as being formed vertically straight up-and-down. However, the laser 80 from the position shown in FIG. 12 emits the laser beam 78 at a skewed angle. The first kerf 150 would not be formed straight up-and-down. The drawing is shown in this fashion in FIG. 12 because the drawing is not to scale since the distance between the laser 80 and the outer surface 32 and the distance 174 between kerfs 150 are not to scale. In actuality, the distance 174 is measured in thousandths of an inch whereas the distance between the laser 80 and the surface 32 is measured in inches if not feet.

Figure 11B:
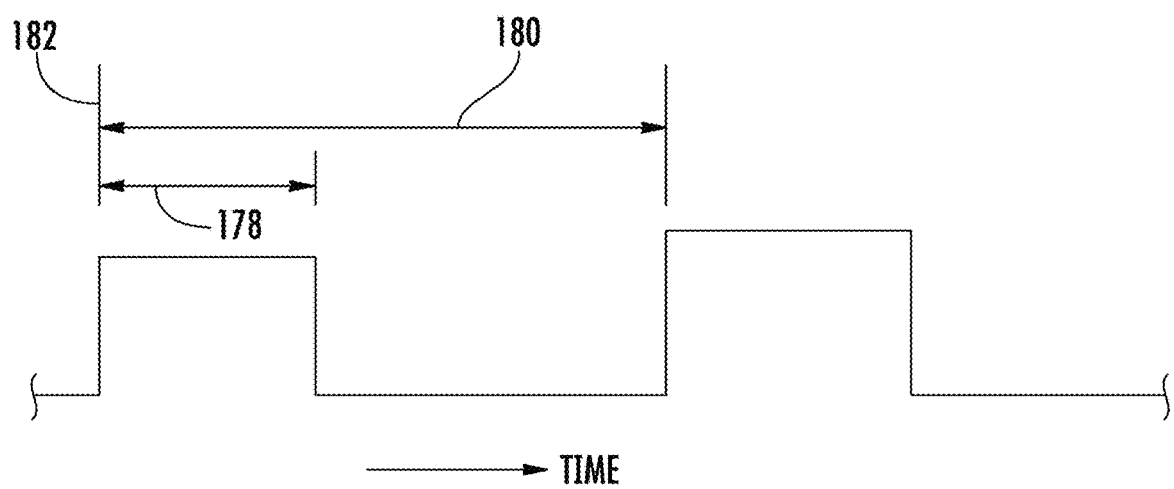
FIG. 11B is a schematic diagram illustrating a pulse width of a laser beam of the laser.

Referring now to FIG. 11B, a length of the kerf 150 and a gap between kerfs 150 may be defined by a pulse width 178 and a speed of the laser beam 78 which are adjusted on the laser 80. The pulse width 178 is defined by a length of time that the laser 80 is generating the laser beam 78 over a period 180 of fixed time. Laser beams 78 pulse at regular intervals. The pulses are defined by the period 180 of fixed time. The pulse width 178 of the laser beam 78 and the linear speed of the laser beam 78 on the surface 32 defines a length of the kerf 150. After the laser 80 is turned off so that no laser beam 78 is emitted from the laser 80, the laser 80 is turned back on after the period 180 of fixed time from the beginning 182 of the prior pulse width 178. This defines the gap between kerfs 150.

The laser 80 may be rated at a particular wattage. By way of example and not limitation, the laser 80 may be a 70 watt laser 80.

Referring now to the chart below, the laser 80 may be adjusted differently for each of the roughing pass, smoothing pass and annealing pass. When the laser 80 makes the roughing pass, the laser 80 is set to the roughing setting shown below. In this regard, the roughing setting may create a plurality of kerfs 150 having a kerf width 170 between about 0.004 inches and about 0.0021 inches. The laser beam 80 may pass over the area 152 two times. During the first pass, the laser beam 78 may have a crosshatching angle 172 of about 45°. During the second pass, the laser beam 78 may have a crosshatching angle 172 of about 180°. The laser beam 78 runs parallel with respect to the central axis 46 of the body 18. The laser 80 may be set at 90% power for a 70 watt laser 80. The pulse width 178 of the laser beam 78 may be set to 420 ns. The laser beam 78 travels on the surface 32 of the body 18 at around 80 inches per second during the roughing pass. The roughing pass creates a plurality of kerfs 150 and projects the recast material 166 upward to form peaks 168. The setting for the roughing pass may be set so as to create an aggressive texture in that the peaks 168 may tear a belt running on the pulley during use of the pulley. As such, the roughing pass may be followed up with a smoothing pass.

Stainless Steel

TABLE 1

Settings of laser machine for 17-4 stainless steel

| | Roughing setting | Smoothing setting | Annealing Setting |
|---|---|---|---|
| Kerf width including recast material | 0.004 inches | 0.0038 inches | 0.0026 inches |
| Kerf width not including recast | About .0021 inches | About .0022 inches | About .0019 inches |
| Cross hatching angles (parallel lines to fill an area, 180 degrees, 90 degrees, 45 degrees and 120 degrees. (Option of outlining area)) | 45/180 degrees | 45 degrees | 45 degrees |
| Size of cross hatching | Min. distance between parallel lines is greater than the kerf width of the roughing setting plus 0.0005 inches to 0.004 inches (preferably, 0.004 inches or double the kerf width for a kerf width of 0.002 inches) | Smaller than kerf width of the roughing setting | Greater than kerf width of annealing setting |
| Power of machine and % wattage | 90% of 70 watt | 90% of 70 watt | 55% of 70 watt |
| Pulse width | 420 nanoseconds (34 waveform) | 200 nanoseconds (2 waveform) | 30 nanoseconds (22 waveform) |
| Speed | 80 inches per second | 60 inches per second | 35 inches per second |

The smoothing pass rounds out the peaks 168 of the recast material 166. In order to do so, the kerf width 170 is set to be smaller than the kerf width 170 during the roughing pass. In our example, the kerf width 170 for the smoothing pass is set to be about equal to the kerf width 170 during the roughing pass. The crosshatching angle 172 is set to the crosshatching angle 172 of the roughing pass. In our example, the roughing pass had two different crosshatching angles 172. The crosshatching angle 172 during the smoothing pass may be set to either one of the crosshatching angles 172 used during the roughing pass. The distance 174 of the crosshatching may be smaller than the kerf width 170 of the roughing pass. The reason is that the laser beam 78 during the smoothing pass needs to hit a significant amount of peaks 168 to round out or knock down the peaks 168. In order to account for any misalignment between the laser beam 78 and the kerfs 150 made during the roughing pass, reducing the crosshatching size 174 to be smaller than the kerf width 170 of the roughing pass enables the laser 80 to round out a significant portion (i.e., more than 25%, 50% or 75%) of the peaks 168 of the recast material 166. The smoothing pass is not meant to generate new indentations in the surface 32 of the body 18. Rather, the smoothing pass is designed to round off the peaks 168 of the recast material 166. In this regard, the pulse width is significantly reduced so that less energy is introduced into the surface 32 of the body 18. Also, the speed of the laser is reduced in order to ensure that a significant portion of the peaks 168 generated during the roughing pass are rounded out or knocked down.

Figure 13:
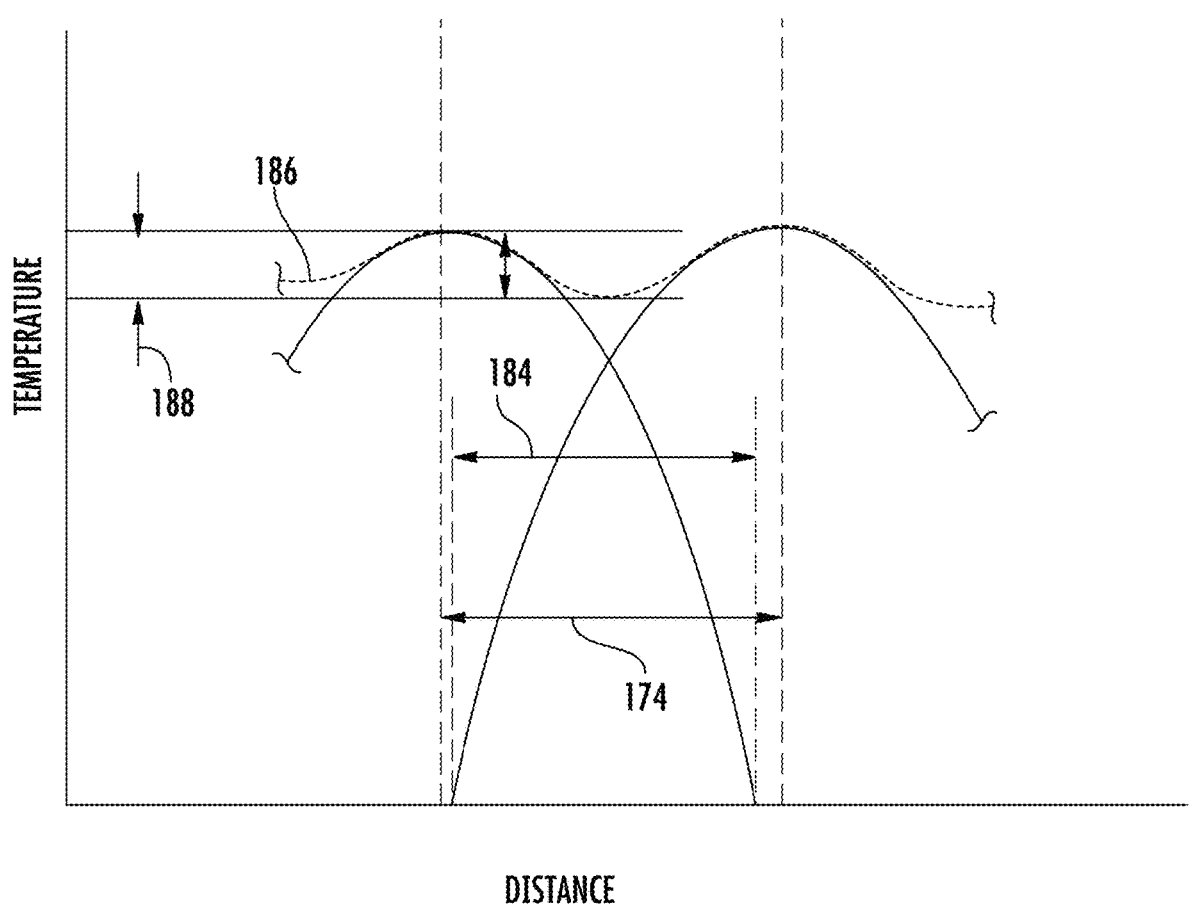
FIG. 13 is a graph of temperature as a function of distance as the laser beam passes over the outer surface of the pulley assembly to anneal the outer surface.

After the roughing and smoothing passes, it is also contemplated that the surface 32 may be annealed by adjusting the laser 80 with the annealing setting shown above. The annealing pass may also be used to add color to the exterior surface. In annealing the surface 32 of the body 18, the annealing takes place on the surface 32 of the body 18 to a depth of about a few thousandths of an inch below its exterior. Referring now to FIG. 13, as the laser beam 78 passes over the outer surface 32 of the body 18, the laser beam 78 introduces heat into the outer surface 32 of the body 18. The center of the laser 78 introduces the most amount of energy into the outer surface 32 of the body 18. As such, this position increases the temperature of the outer surface 32 the greatest amount. As one measures the temperature going away from that position on the surface 32, the temperature of the surface 32 decreases as shown in FIG. 13. When the laser beam 78 creates a hatching pattern, the laser beam 78 forms a series of parallel lines separated by distance 174. In particular, the laser beam 78 introduces heat into the outer surface adjacent to a first line and raises the temperature of the outer surface 32 in the same manner as before. However, there may be a slight overlap 184 so that the heat introduced into the outer surface 32 by the first line may be additive to the heat introduced into the outer surface 32 by the second line. The dashed line 186 shows the temperature fluctuation on the outer surface. The annealing settings on the laser 80 are set so that the temperature of the outer surface remains within a narrow band 188 sufficient to raise the temperature of the outer surface 32 to anneal or harden the outer surface 32 on the area 152 thereof or create a consistent discoloration thereof. The temperature range to anneal the outer surface for 17-4 stainless steel may be about 800 degrees Fahrenheit to about 1500 degrees Fahrenheit, and more preferably between about 900 degrees Fahrenheit to about 1150 degrees Fahrenheit.

The various settings described herein were for 17-4 stainless steel. However, the general principles of forming the roughing setting, smoothing setting and the annealing settings may be applied to other types of metallic materials such as alloys of iron and carbon, steel, magnesium alloy, sheet metal, aluminum, carbon steel, etc. with different settings per their own material characteristics. The settings are for a model 70W_EP_Z from SPI Lasers, LLC. FIG. 14 is a table of settings for 17-4 stainless steel and aluminum. The table illustrates a slightly different setting for 17-4 stainless steel compared to the chart above in that the smoothing pass may be accomplished with two passes instead of one pass as discussed above. The table in FIG. 14 illustrates two different settings for aluminum. The first setting sets the laser so that the aluminum material is in a sense micro machined with a slight recast material protruding upward, whereas the second setting sets the laser to have more recast material protrude upward compared to the first setting. The first and second settings may illustrate a range of settings for aluminum.

The various aspects described herein are in relation to the formation of an emboss and deboss of a textured surface on a surface of a pulley having a plurality of grooves wherein the pulley grooves engage a belt in order to transmit power from a first shaft upon which the pulley is mounted to a second shaft generally parallel to the first shaft. Moreover, the various aspects described herein for the emboss and deboss of a textured surface have also been described in relation to forming the embossed/debossed textured surface on pulleys of a continuously variable transmission or CVT. The embossed/debossed textured surface is formed on first and second parts of a pulley of the CVT, and more particularly on a gripping surface which is where the belt engages for transmitting power between the first and second shafts. More broadly, it is also contemplated that the method and apparatus for forming the emboss or debossed textured surface may be applied to other applications including but not limited to the following applicational uses. The embossed or debossed textured surface may be formed on a pulley having a helical groove or a straight or helical gear, flat cylindrical pulley, etc. By way of example and not limitation, a drum may have a plurality of belts mounted thereto for transmitting power to or from the drum to a second shaft. The embossed or debossed textured surface may be formed on the drum where the drum engages the belt. The embossed or debossed textured surface may also be formed on a spindle of a lathe. Broadly speaking the embossed or debossed textured surface may be formed utilizing the method and apparatus as described herein on a surface that is used to engage a belt or other power transmission means to increase the coefficient of friction of the surface in order to prevent slippage between the power transmission means and the surface.

Referring now to FIGS. 15-20, a friction patch or lines may be applied to one or more areas of a firearm so that the user's hand does not slip and cause the firearm to slip out of the user's hand during usage. By way of example and not limitation, the friction lines or patches may be applied to parts such as including but not limited to the frame 302, grip 300*a, b*, slide 306 and rail 308 of the firearm 310*a, b*. The formation of the friction patch or lines may be by way of the emboss method and/or the deboss method described herein.

For both the deboss method and the emboss method, the entire firearm 310*a, b* or a part (e.g. frame 302, slide 306, grip 300*a, b* or rail 308) may be manipulated by the machine used by the deboss method and the emboss method in order to apply the friction patch or lines to select areas of the firearm or parts thereof.

Referring now to FIGS. 15-20, the handgun 310*a* is illustrated. The handgun 310*a* may have a frame 302 which includes a trigger guard 312 and the grip 300*a*. The handgun 310*a* may also have a slide 306. The frame 302 may be fabricated from a metallic or polymer material. In the handgun 310*a* shown in FIG. 15, the frame 302 may be fabricated from a polymer material. In contrast, the slide 306 may be fabricated from a metallic material. Both the emboss and deboss methods for forming the friction patch or lines may be applied to metallic parts of the firearm 310*a*. Additionally, the emboss and deboss methods may be utilized for forming the friction patch or lines on polymer parts of the firearm 310*a* but it is preferred to utilize the deboss method on polymer parts of the firearm 310*a* as well as the metallic parts of the firearm 310*b*.

Figure 15:
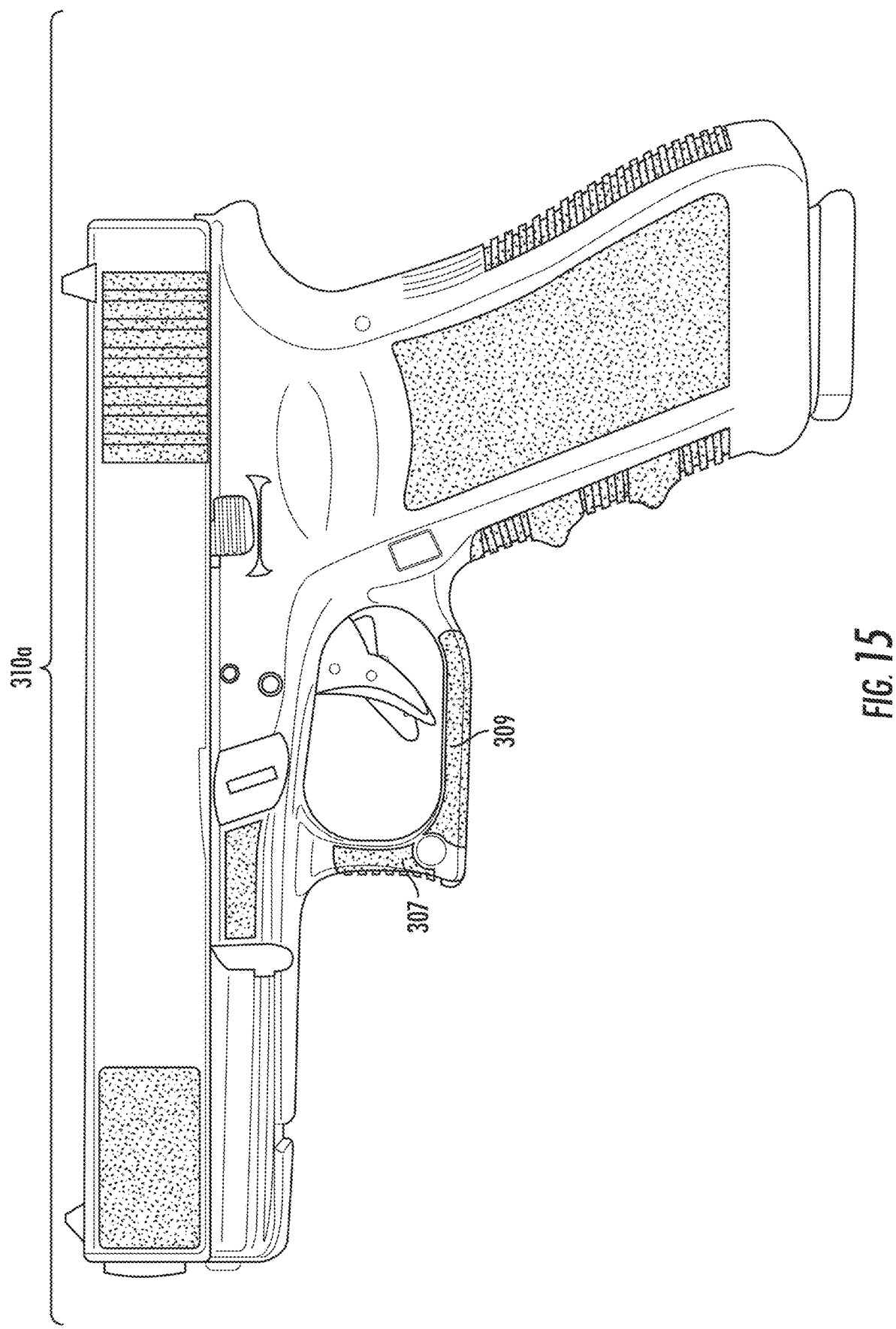
FIG. 15 is a side view of a handgun with friction patches on a frame and slide of the handgun.
Figure 16:
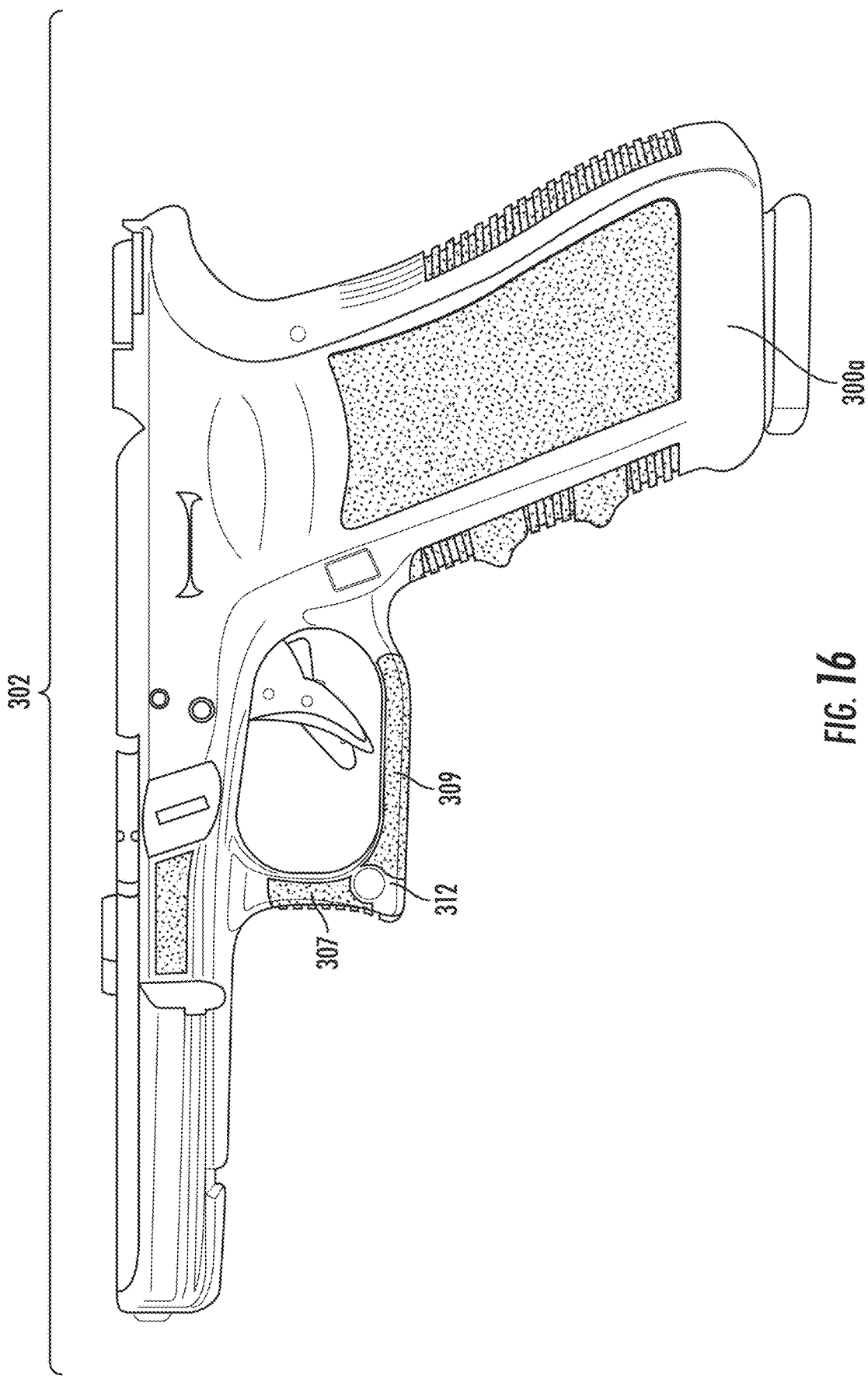
FIG. 16 is a side view of the frame of the handgun shown in FIG. 15.
Figure 17:
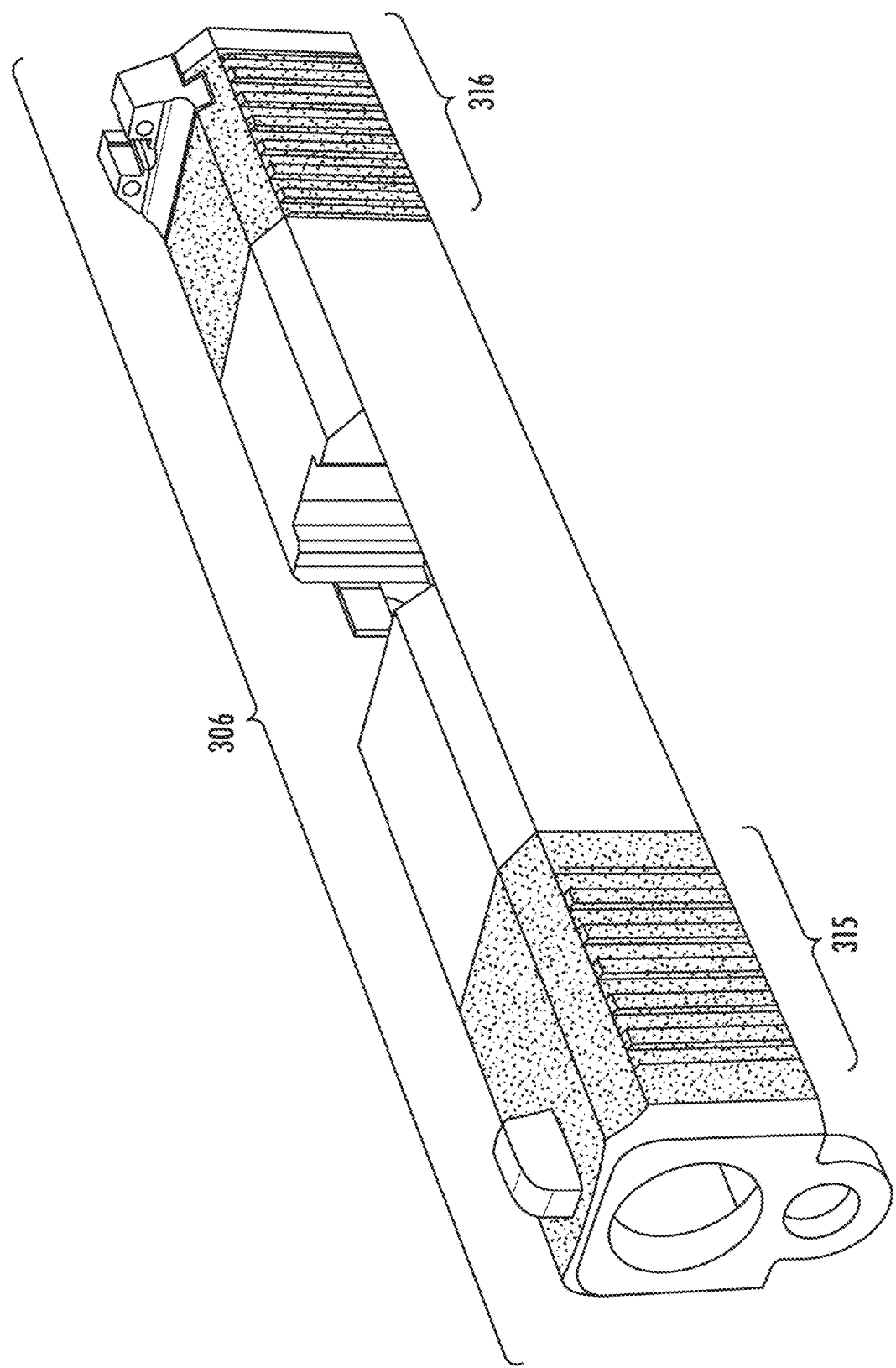
FIG. 17 is a perspective view of the slide of the handgun shown in FIG. 15.
Figure 21:
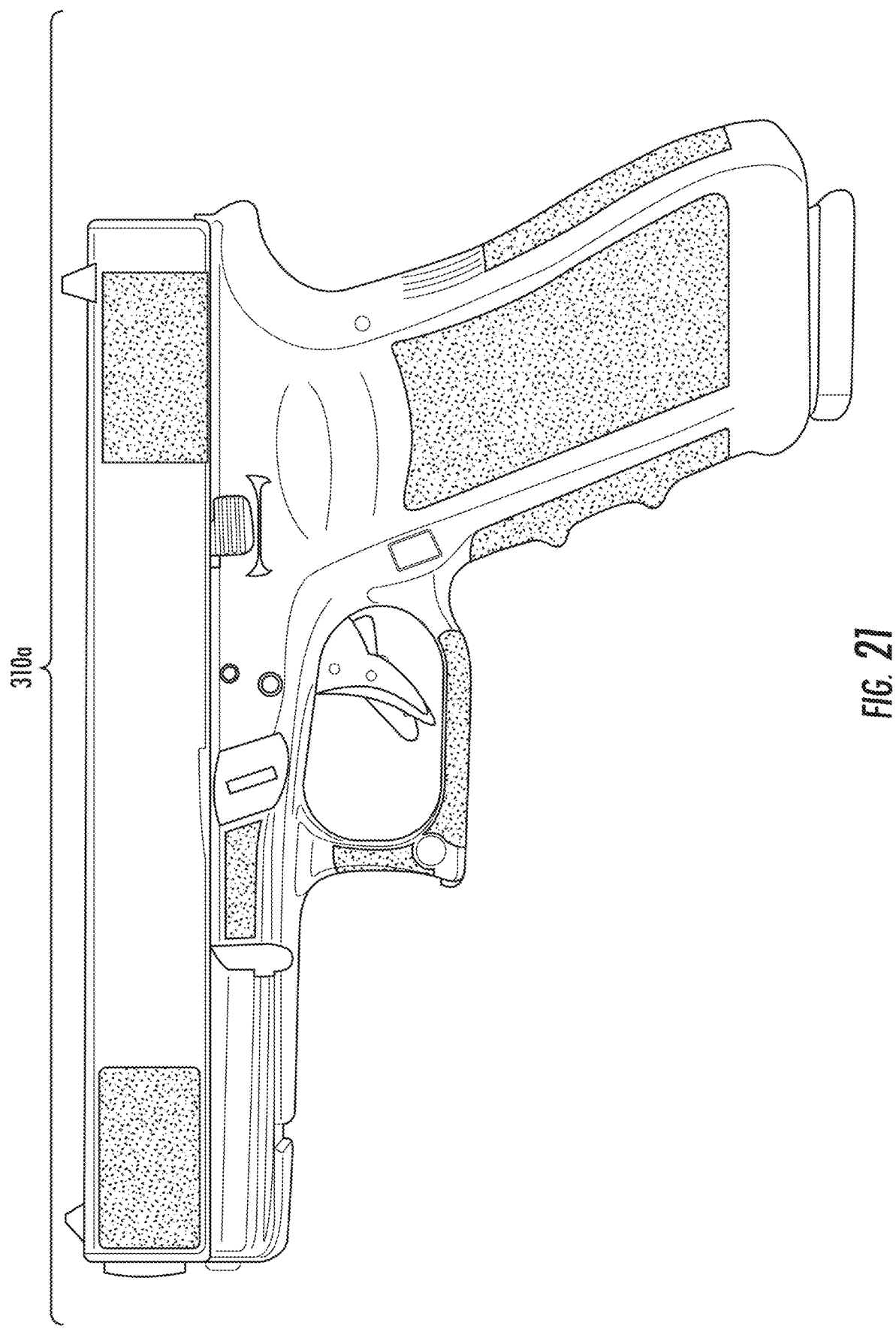
FIG. 21 is a side view of the handgun with the manufacturer's grip texture removed from the slide and frame, and the friction patches applied to the frame and slide of the handgun.

The friction patch or lines may be formed on a front side 307 and bottom side 309 of the trigger guard 12, a front side, lateral sides and/or rear side of the grip 300*a*. It is also contemplated that the friction patch (see FIG. 15) may be placed on one or both sides of the frame where an index finger rests after drawing the firearm from a holster up until the point at which the operator makes the conscious decision to discharge the weapon where the index finger should rest during that period of time. The location of the friction patch can be custom located based on the operator's hand size. The friction patch or lines may also be formed on lateral sides of a forward portion 314 of the slide 306. The friction patches may be formed over the existing grip features as shown in FIG. 15 or after the existing grip features have been removed (e.g., milled off) as shown in FIG. 21. The friction patch or lines may extend about 1 to 2 inches from a distal portion 315 of the slide 306 to the proximal end of the slide 306. Additionally, the friction patch or lines may be formed on an upper side of the slide 306 near the distal end of the slide 306. The friction patch or lines formed on the upper side of the slide 306 may extend out co-extensively to the friction patch or lines formed on the lateral sides at the forward portion of the slide 306. The same may be true for the rear portion of the slide 306. In particular, the friction patch or lines may be formed on lateral sides of a rearward portion 316 of the slide 306. The friction patch or lines may extend about 1 to 2 inches from a proximal end of the slide 306 to the distal end of the slide 306. Additionally, the friction patch or lines may be formed on an upper side of the slide near the proximal end of the slide 306. The friction patch or lines formed on the upper side of the slide may extend out co-extensively to the friction patch or lines formed on the lateral sides at the rearward portion of the slide 306. These friction patches and lines formed on the slide may be utilized so that the user can grip the slide 306 and make ready the firearm for firing. Also, the friction patch on the top side of the rearward portion of the slide 306 may be utilized to enable one-handed operation of the slide 306 against a surface or object. The friction patch or lines formed on the slide 306 and portions of the frame 302 may be sufficiently rough so that the texture formed on the slide 306 does not tear the person's skin when the user grips the slide 306 by hand and also increases the user's ability to retain the firearm when needed. Although the friction patches are shown as being applied to a limited area of the frame and slide, it is also contemplated that the friction patches may be placed on the entire or a majority of the exterior of the slide from the front to the back side along the lateral and top sides of the slide.

Figure 18:
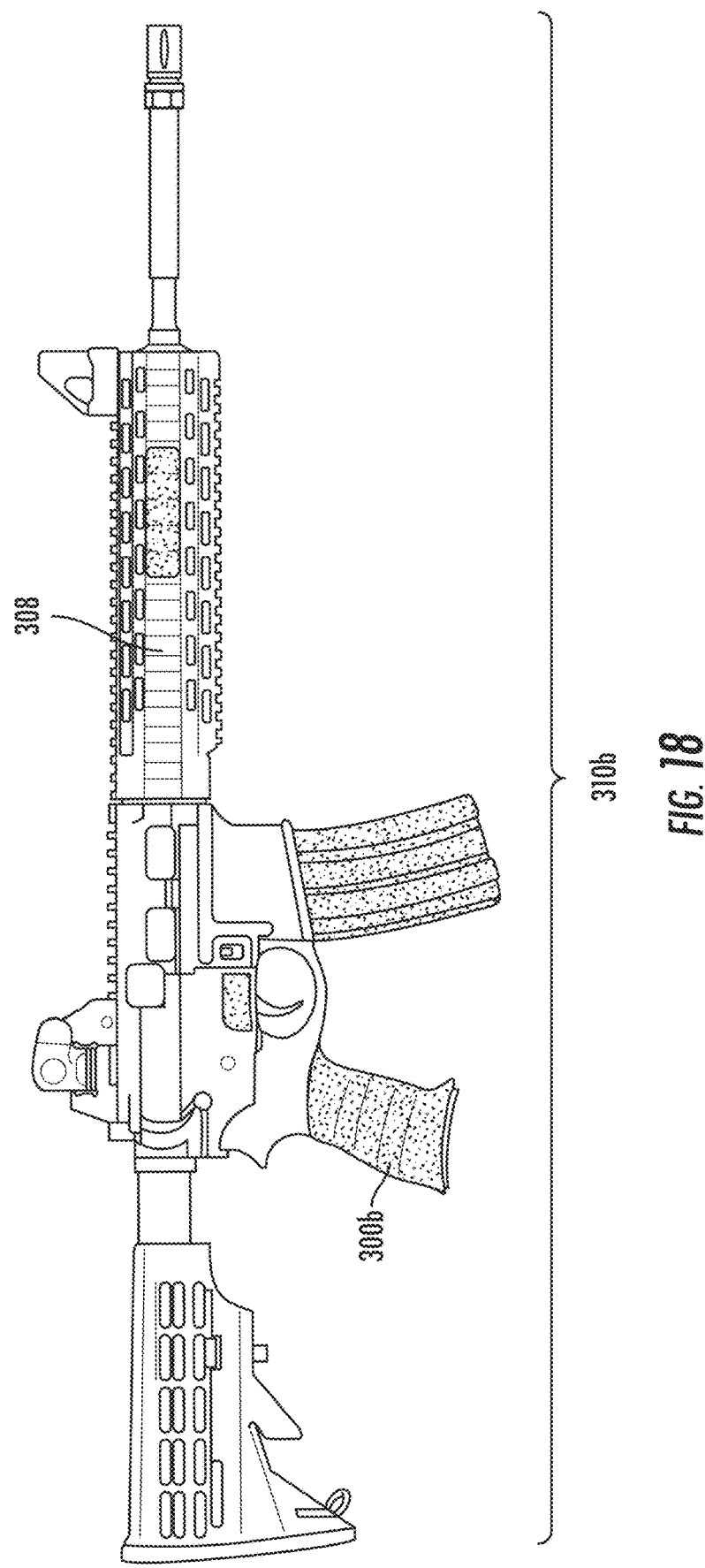
FIG. 18 is a side view of a rifle with friction patches on a grip and rail of the rifle.
Figure 19:
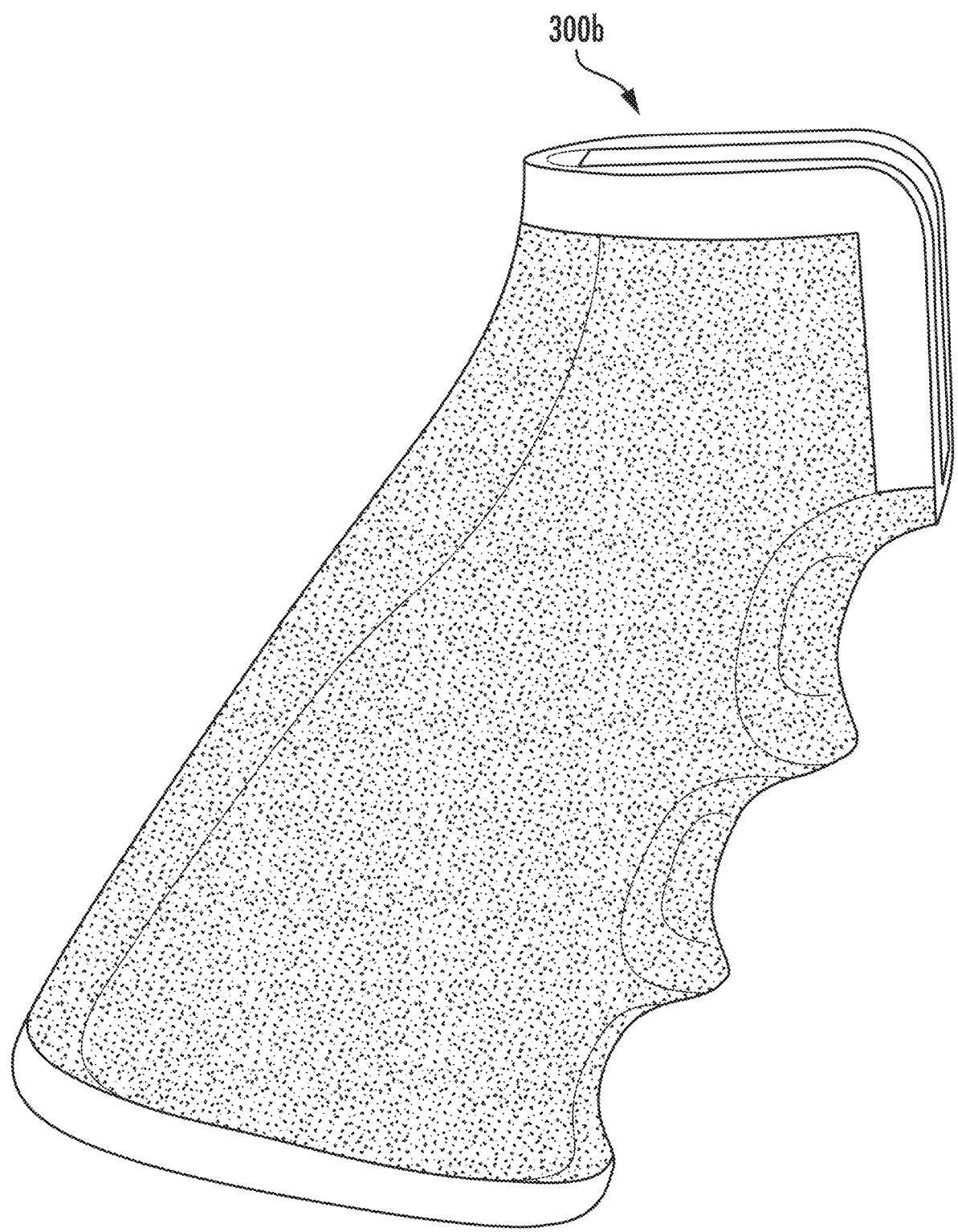
FIG. 19 is a perspective view of the grip shown in FIG. 18.
Figure 20:
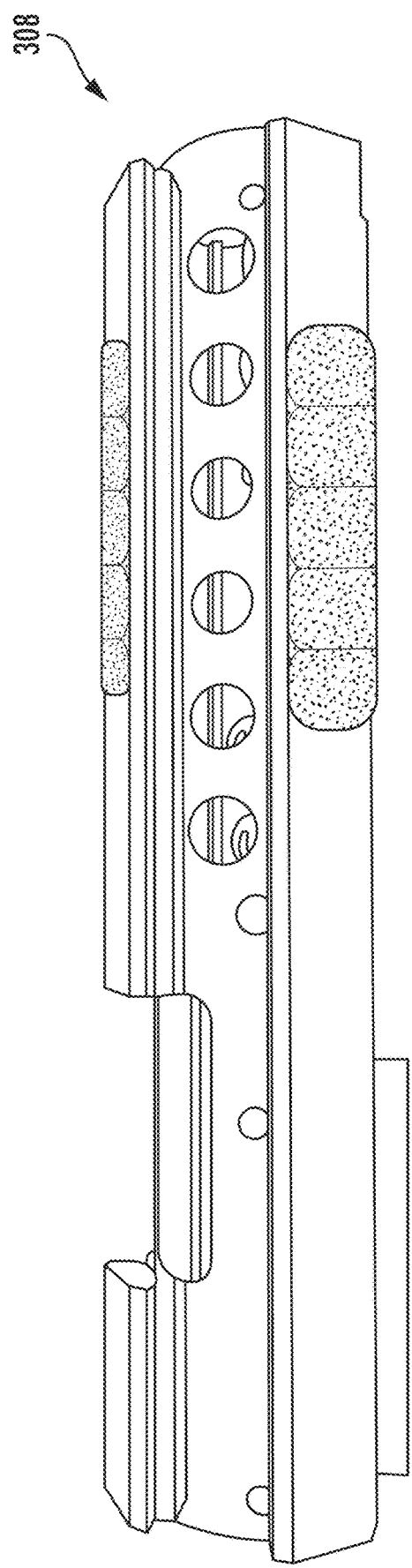
FIG. 20 is a perspective view of the rail shown in FIG. 18.

Referring now to FIGS. 18-20, a rifle 310*b* is illustrated. The rifle 310*b* may have a grip 300*b*. The rifle 310*b* may also have a rail 308. The grip 300*b* may be fabricated from a polymer material. The rail 308 may be fabricated from a metallic material. Both the emboss and deboss methods for forming the friction patch or lines may be applied to metallic parts of the firearm 310*b*. In contrast, the emboss and deboss methods may be utilized for forming the friction patch or lines on polymer parts of the firearm 310b but it is preferred to utilize the deboss method on polymer parts of the firearm 310b.

The friction patch or lines may be formed on a front side, lateral sides and/or rear side of the grip 300b. The friction patch or lines may also be formed on exterior sides of the rail 308. These friction patches and lines formed on the grip and rail may be may be sufficiently rough so that the texture formed on the slide 306 does not tear the person's skin when the user grips the grip 300b or rail 308 by hand and also increases the user's ability to retain the firearm 310b when needed. It is also contemplated that the friction patch (see FIG. 18) may be placed on one or both sides of the lower receiver where an index finger rests after griping the firearm up until the point at which the operator makes the conscious decision to discharge the weapon to help the operator physical sense the proper location where the index finger should rest during that period of time. The location of the friction patch can be custom located based on the operator's hand size.

In forming the friction patches on the firearm 310a, b, the deboss method may comprise both the roughing pass and the smoothing pass but also only the roughing pass. One or more passes for the roughing pass and/or the smoothing pass are contemplated. As shown in the table below there may be 13 roughing passes or 13 roughing passes in combination with one or more and up to 13 smoothing passes. For the polymer parts of the firearm where a friction patch is applied, the laser settings may have the following settings. The setting set forth below represent approximate settings and guidelines for a polymer material. For other materials such as stainless steel, the settings listed in Table 1 may be used as a guideline. The laser may be applied to the polymer and metallic parts of the firearm in a cross hatch pattern or as simple parallel lines. The polymer part may also create a recast with the settings provided below. The recast assists in providing for more grip and better purchase of the firearm.

Polymer

TABLE 2

Settings of laser machine for a polymer material of a firearm

| | Roughing setting | Smoothing setting | Roughing setting (multiple passes) | Smoothing setting (multiple passes) |
|---|---|---|---|---|
| Kerf width including recast material | 0.01791 inches | 0.00406 inches | 0.02149 inches | 0.01169 Inches |
| Kerf width not including recast | 0.00453 inches | 0.00146 inches | 0.00504 inches | 0.00311 inches |
| Cross hatching angles (parallel lines to fill an area, 180 degrees, 90 degrees, 45 degrees and 120 degrees. (Option of outlining area)) | 90/180 deg | 90/180 deg | 90/180 deg | 90/180 deg |
| Size of cross hatching | Min. distance between parallel lines is greater than the kerf width of the roughing setting plus 0.010 inches to 0.050 inches (preferably, 0.025 inches or double the total kerf width for a kerf width of 0.0358 inches) | Smaller than kerf width of the roughing setting | n/a | n/a |
| Power of machine and % wattage | 100% of 70 watt | 78% of 70 watt | 100% of 70 watt | 78% of 70 watt |
| Pulse width | 10 nanoseconds (28 waveform) | 175 nanoseconds (03 waveform) | 10 nanoseconds (28 waveform) | 175 nanoseconds (03 waveform) |
| Speed | 75 inches per second | | | |
| Passes needed to obtain optimum results | 1 | 1 | 13 | 13 |

The above description is given by way of example, and not limitation. Given the above disclosure, one skilled in the art could devise variations that are within the scope and spirit of the invention disclosed herein, including usage of other types of lasers. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method for increasing a coefficient of friction of an external surface of a grip, frame, slide, or rail of a firearm, the method comprising the steps of:
    disposing particulate friction material on the external surface of the grip, frame, slide, or rail of the firearm;
    disposing a laser machine adjacent to the grip, frame, slide, or rail so that a laser beam of the laser machine is in a line of sight to the external surface of the grip, frame, slide, or rail of the firearm;
    adjusting the laser machine so that laser beam is capable of fusing the particulate friction material to the external surface of the grip, frame, slide, or rail of the firearm to increase a roughness of the grip, frame, slide, or rail of the firearm;
    applying the laser beam of the laser machine onto the external surface of the grip, frame, slide, or rail of the firearm with the adjusted laser machine to fuse the particular friction material to the external surface of the grip, frame, slide, or rail of the firearm for increasing the coefficient of friction of the grip, frame, slide, or rail of the firearm.

2. The method of claim 1 further comprising a step of rotating the grip, frame, slide, or rail of the firearm after the applying step.

3. The method of claim 1 further comprising a step of rotating the grip, frame, slide, or rail of the firearm while performing the applying step.

4. The method of claim 1 wherein the disposing the particulate friction material comprises a step of coating the particulate friction material on the external surface of the grip, frame, slide, or rail of the frame.

5. The method of claim 1 wherein the disposing the particulate friction material comprises a step of spraying the particulate friction material on the external surface of the grip, frame, slide, or rail of the frame.

6. The method of claim 1 wherein the disposing the particulate friction material comprises a step of disposing particulate metallic material on the external surface of the grip, frame, slide, or rail of the frame.

7. A firearm component with a friction material bonded to an external surface of the firearm component, the firearm component comprising:
    a body of the firearm component;
    a particulate friction material disposed on the external surface of the firearm component wherein a particular friction material is laser infused to the external surface of the body of the firearm component.

8. The firearm component of claim 7 wherein the friction material is confirmed into a pattern on the external surface.

9. The firearm component of claim 7 wherein the friction material is a powdered material with an average size between 20-100 microns.

10. The firearm component of claim 7 wherein the particulate friction material is particulate metallic material.

11. The firearm component of claim 10 wherein the particular metallic material is tungsten, carbines, cobalt, titanium, aluminum, steel or combinations thereof.

12. The firearm component of claim 8 wherein the pattern is a straight line.

* * * * *